United States Patent [19]

Tsuchiya et al.

[11] Patent Number: 5,134,272

[45] Date of Patent: Jul. 28, 1992

[54] IMAGE SIGNAL PROCESSING APPARATUS FOR BAR CODE IMAGE SIGNAL

[75] Inventors: Hiroyoshi Tsuchiya; Atsuharu Yamamoto, both of Kawasaki; Kunio Sannomiya, Atsugi; Hiroaki Kotera, Kawasaki; Katsuo Nakazato, Tokyo; Mikio Fujita, Yokohama; Shigeo Komizo, Tokyo, all of Japan

[73] Assignee: Matsushita Electric Industrial Co., Ltd., Japan

[21] Appl. No.: 379,123

[22] Filed: Jul. 13, 1989

[30] Foreign Application Priority Data

| Jul. 13, 1988 | [JP] | Japan | 63-174548 |
| Jul. 13, 1988 | [JP] | Japan | 63-174556 |
| Jul. 13, 1988 | [JP] | Japan | 63-174571 |
| Jul. 13, 1988 | [JP] | Japan | 63-174572 |
| Sep. 1, 1988 | [JP] | Japan | 63-219071 |
| Sep. 30, 1988 | [JP] | Japan | 63-248147 |

[51] Int. Cl.⁵ .......... G06K 9/20; G06K 7/10; G06K 9/32
[52] U.S. Cl. .................. 235/462; 235/464; 382/12; 382/48
[58] Field of Search .......... 235/462, 463, 464; 382/12, 49, 44, 48, 9

[56] References Cited

U.S. PATENT DOCUMENTS

| 4,253,018 | 2/1981 | Amacher | 235/463 |
| 4,387,298 | 6/1983 | Peterson et al. | 235/463 X |
| 4,402,088 | 8/1983 | McWaters et al. | 235/462 X |
| 4,403,339 | 9/1983 | Wevelsiep et al. | 235/463 X |
| 4,414,468 | 11/1983 | Laurer et al. | 235/462 |
| 4,513,442 | 4/1985 | Scherl | 382/49 |
| 4,736,109 | 4/1988 | Dvorzsak | 235/464 X |
| 4,988,852 | 1/1991 | Krishman | 235/462 |

FOREIGN PATENT DOCUMENTS

| 0027594 | 4/1981 | European Pat. Off. |
| 0059239 | 9/1982 | European Pat. Off. |
| 0081316 | 6/1983 | European Pat. Off. |
| 3205189 | 8/1983 | Fed. Rep. of Germany |
| 57-59285 | 4/1982 | Japan |

OTHER PUBLICATIONS

"Types of Bar Code Reader"; Nikkei Electronics of Dec. 22, 1980, p. 142.
Siemens Forsch. u. Entwickl. Berichte, vol. 8, No. 5, 1979, pp. 297–302; U. Hendricks et al.: "Analoge Echtzeitbildverarbeitung zur Erzeugung binärer Muster".

*Primary Examiner*—Stuart S. Levy
*Assistant Examiner*—Joseph A. Rhoa
*Attorney, Agent, or Firm*—Lowe, Price, LeBlanc & Becker

[57] ABSTRACT

An apparatus for receiving input data values representing an array of picture elements of a source image containing one or more bar code regions, whereby the input data values are converted to bi-level values representing black or white states which are stored in an image memory, while in addition the bi-level values are processed to obtain data representing an image in which a "skeleton" central portion of the bar code region appears as an all-black region, while background black regions are eliminated. A central position and the slope of a central axis of the bar code region are computed based on that "skeleton" region, and data values in the image memory which conform to the central axis are then read out, to read the bar code data.

9 Claims, 29 Drawing Sheets

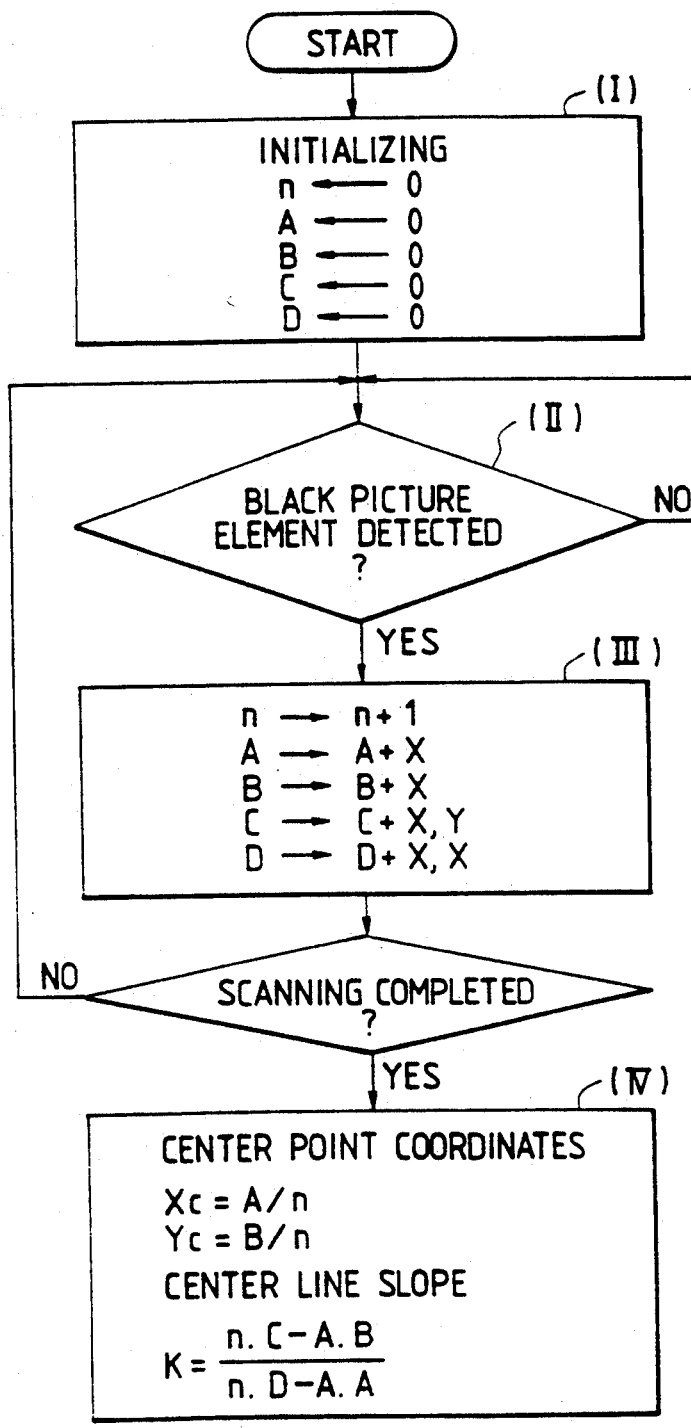

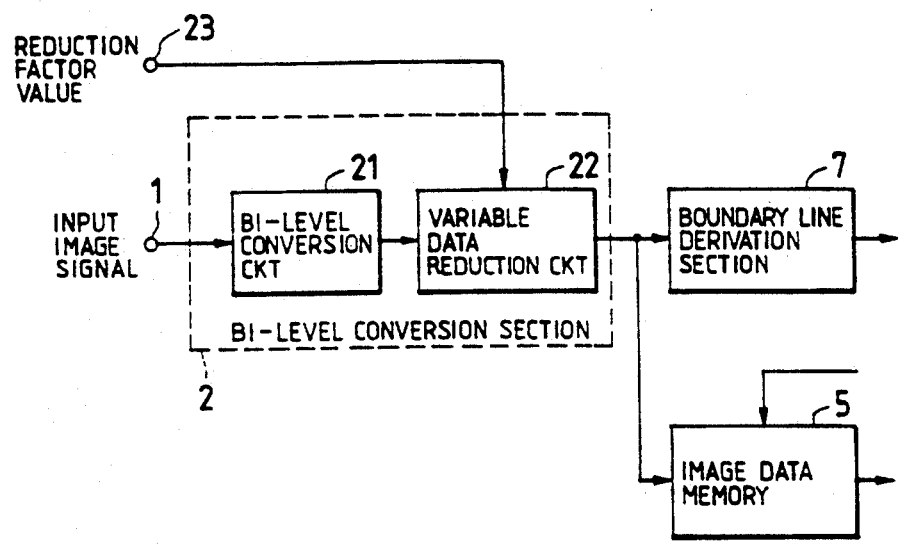
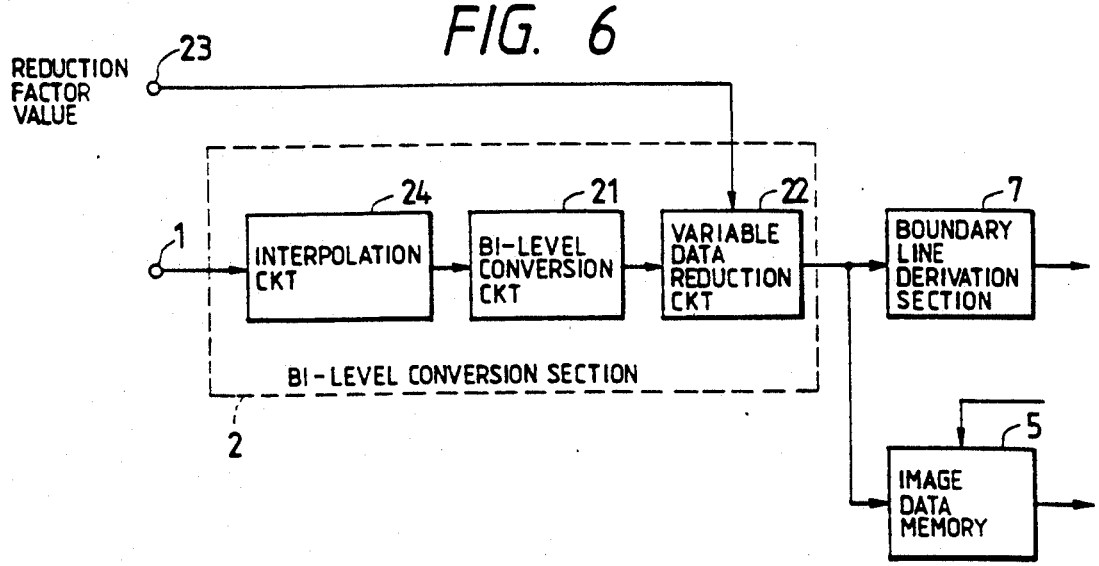

| Block | Fields | Value |
|---|---|---|
| FIRST BLACK ROW BLOCK | Y-COORDINATE Y | $y_3$ |
| | INITIAL X-COORDINATE Xs | $x_7$ |
| | FINAL X-COORDINATE Xe | $x_{10}$ |
| SECOND BLACK ROW BLOCK | | $y_4$ |
| | | $x_8$ |
| | | $x_{10}$ |
| THIRD BLACK ROW BLOCK | | $y_{10}$ |
| | | $x_8$ |
| | | $x_9$ |
| ⋮ | | $y_{10}$ |
| | | $x_{17}$ |
| | | $x_{19}$ |
| | | $y_{11}$ |
| | | $x_7$ |
| | | $x_{10}$ |
| | | $y_{11}$ |
| | | $x_{17}$ |
| | | $x_{21}$ |
| | | $y_{12}$ |
| | | $x_6$ |
| | | $x_{11}$ |
| | | $y_{12}$ |
| | | $x_{16}$ |
| | | $x_{21}$ |
| NINTH BLACK ROW BLOCK | | $y_{13}$ |
| | | $x_{15}$ |
| | | $x_{12}$ |

FIG. 20

COORDINATE REGISTER
FOR TERMINAL POINTS
OF FIRST BLACK REGION
{
| 0 | x | } $y_{min}(1)$
|---|---|
| S | y |
| 0 | x | } $y_{max}(1)$
| 0 | y |
| M | x | } $x_{min}(1)$
| 0 | y |
| 0 | x | } $x_{max}(1)$
| 0 | y |
}

COORDINATE REGISTER
FOR TERMINAL POINTS
OF SECOND BLACK REGION
{
| 0 | x | } $y_{min}(2)$
|---|---|
| S | y |
| 0 | x | } $y_{max}(2)$
| 0 | y |
| M | x | } $x_{min}(2)$
| 0 | y |
| 0 | x | } $x_{max}(2)$
| 0 | y |
}

COORDINATE REGISTER
FOR TERMINAL POINTS
OF N$^{TH}$ BLACK REGION
{
| 0 | x | } $y_{min}(N)$
|---|---|
| S | y |
| 0 | x | } $y_{max}(N)$
| 0 | y |
| M | x | } $x_{min}(N)$
| 0 | y |
| 0 | x | } $x_{max}(N)$
| 0 | y |
}

IMAGE SIGNAL PROCESSING APPARATUS FOR BAR CODE IMAGE SIGNAL

FIELD OF APPLICABLE TECHNOLOGY

The present invention relates to an image signal processing apparatus for processing an input image signal obtained by line-sequential scanning of a source image which includes one or more bar code labels, to read and decode the bar code.

In particular, the invention relates to an image signal processing apparatus for processing such a bar code image signal, which will automatically ensure accurate reading and decoding of the bar code even if the bar code labels are arbitrarily positioned and inclined within the source image.

BACKGROUND OF THE INVENTION

Bar codes have been widely used in the prior art, in general for POS merchanidizing applications in supermarkets, etc. The bar code may be printed on adhesive labels, which are then attached to surfaces of respective articles which are to be sold, or may be directly printed on a surface of the article. In the present specification, the term "bar code label" is used for convenience of description to signify a printed bar code pattern, irrespective of whether the pattern has been directly printed on a surface of an article or has been printed on a separate label which is then attached to the article. To avoid misunderstanding, the term "bar code label" should be understood to signify the entire label, which consists of an array of parallel bars and, generally, a line of numerals. The term "bar code region" as used herein signifies only the array of parallel bars in the bar code label. The bar code labels may be disposed at various arbitrary positions and inclinations upon the articles, and there may be two or more bar code labels closely mutually adjacent on the surface of each article. As a result, it has been difficult to provide an apparatus which will enable the bar code to be read and decoded in a rapid and reliable manner, without manual adjustment of the way in which each bar code label is scanned in order to be read. To overcome this problem, various proposals for bar code readers have been made in the prior art. THese generally are based upon scanning a bar code pattern in a plurality of different directions, to ensure that at least one correct scan (e.g. by a light beam of an optical bar code reading device) across the bar code label will occur. Here, the term "correct scan" signifies a scan which intersects all of the bars of the bar code pattern, and is oriented substantially perpendicular to the direction of elongation of the bars. Such prior art proposals are summarized in the Japanese magazine Nikkei Electronics of Dec. 22, 1980, page 142 in an article entitled "Types of Bar Code Reader".

However there are no prior art examples of a method or apparatus for finding and reading a bar code region of a source image, where the bar code region is represented as data within successive data values of a signal that has been obtained by raster scanning of the source image. Such an image data signal is for example produced in the prior art by facsimile scanning.

SUMMARY OF THE INVENTION

It is an objective of the present invention to provide an image signal processing apparatus for processing an input image signal that has been obtained by raster scanning of a source image containing a bar code region, to read and decode the bar code.

According to the present invention, processing of data representing such a source image is executed to obtain data in which each bar code region is converted to a rectangular all-black region, of identical position and orientation to the original bar code region. In this processing, background black regions in the background of the source image are also converted to corresponding black regions containing expanded numbers of black picture elements. The data thus obtained are subjected to contraction processing using a scanning window, to execute contraction of all of the black regions, to thereby substantially entirely eliminate the background black regions, and leave a black region corresponding to each bar code region, but of smaller size. In addition to the above processing, the input data values representing the source image are stored in an image memory, at positions corresponding to respective picture elements in the source image.

A first embodiment of the invention is applicable to bar code regions which are of rectangular elongated shape. In this case, the result of the aforementioned contraction processing is to leave a thin, straight elongated black region corresponding to each bar code region of the source image. The center position and slope of such an elongated black region can be easily computed, and from this information and the known length of the bar code region, a linear array of data values can be read out from the image memory, corresponding to a set of successive picture elements which lie along a central axis of elongation of the bar code, to thereby read the code data. These are then decoded.

Another embodiment of the invention is applicable to bar code regions which are not substantially elongated. With that embodiment, after the aforementioned contraction processing has been completed, data representing the positions of the four corners of a resultant black region corresponding to a bar code region are computed. One or both of the central axes of the bar code region can thereby be computed, and the code data thereby read out from the image memory, and decoded.

More specifically, the invention provides an image signal processing apparatus for processing an input image signal representing successive data values of an array of picture elements of a source image containing at least one bar code region of rectangular shape, the array comprising successive scan lines each extending along a main scanning direction, with the scan lines successively arrayed along a secondary scanning direction, the apparatus comprising:

bi-level conversion means for converting the data values of the input image signal to successive bi-level data values selectively indicating respective black and white states of the picture elements;

image memory means for storing the bi-level data value;

bar code region detection means for processing the bi-level data values to obtain bi-level data values representing a converted image containing a black region of substantially identical shape and orientation to the bar code region in the source image, and in which substantially all other black portions of the source image are eliminated to form a white background;

bar code position detection means for receiving the data values from the bar code region detection means, to derive position coordinates representing a central axis and a center position of the black region, and for computing, based on a known length of the bar code region along the central axis and on the center position, respective read-out coordinates of a linear array of picture elements extending along the central axes within the bar code region; and decoding means for reading out from the image memory means respective bi-level data values corresponding to the linear array of picture elements, and for decoding the bi-level data values to obtain data of the bar code region.

BRIEF DESCRIPTION OF THE DRAWINGS

FIG. 4 is an operation flow chart of operations for deriving the center position coordinates and center line inclination value of a bar code region from a "skeleton" black region;

FIGS. 5 and 6 are respective partial system block diagrams showing respective bi-level conversion sections of second and third embodiments of an image signal processing apparatus according to the present invention;

FIGS. 10(a) to (i) are conceptual diagrams for describing a pattern discrimination operation executed by a black region contraction section of a fourth embodiment of the invention;

FIG. 15(b) is a diagram to illustrate how position coordinates of respective black row blocks are held in a register;

FIG. 20 is a diagram illustrating how terminal point coordinates of respective black regions are stored in registers, with the seventh embodiment;

DESCRIPTION OF PREFERRED EMBODIMENTS

Figure 1A:
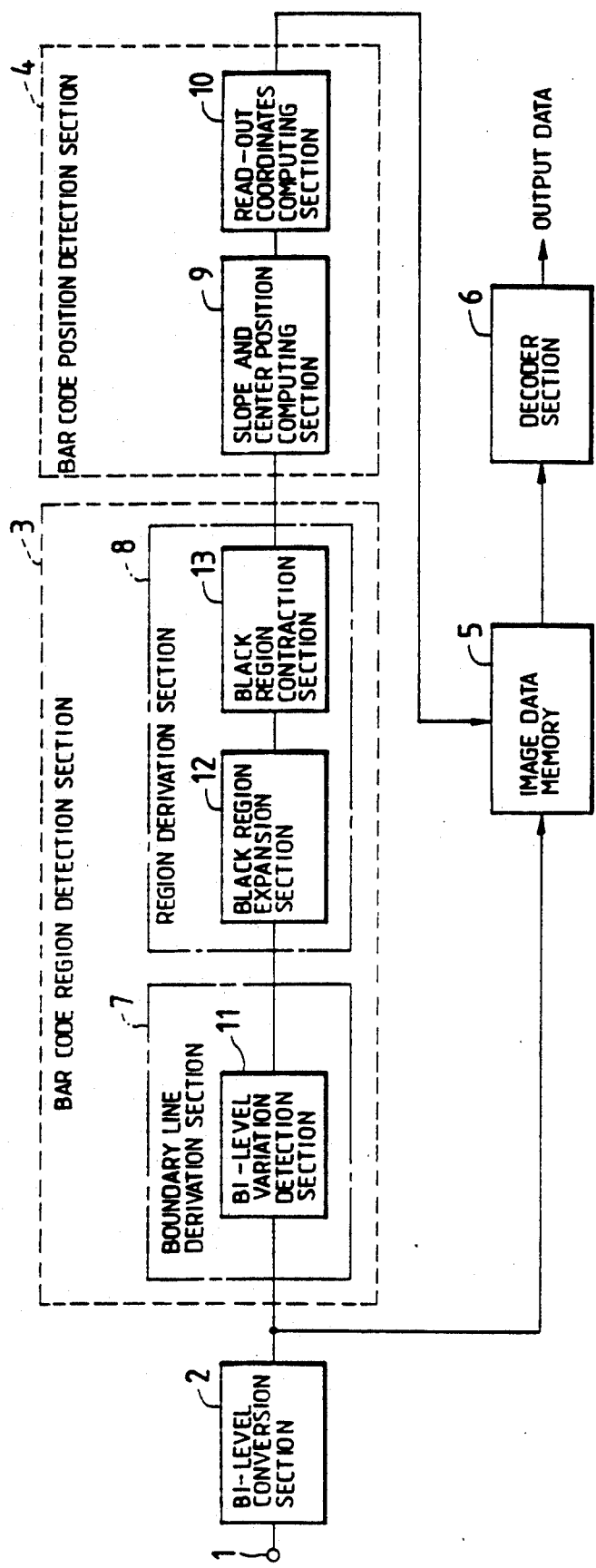
FIG. 1(a) is a general system block diagram of a first embodiment of an image signal processing apparatus according to the present invention.

FIG. 1(a) is a conceptual system block diagram of a first embodiment of an image signal processing apparatus according to the present invention. Numeral 1 denotes an input terminal for receiving a multi-level input image signal, which has been generated by raster scanning of a source image which contains at least one bar code region. Numeral 2 denotes a bi-level conversion section for converting the input image signal to a bi-level signal, consisting of successive data values which correspond to respective ones of an array of picture elements of the source image. Each of these bi-level data values is either a logic 1 or 0 value, corresponding to a black and a white state respectively of a picture element.

Numeral 5 denotes an image memory, for storing the bi-level data values produced from the bi-level conversion section 2 in a 2-dimensional array of addresses. Each address stores one bit, and the address array corresponds to the array of picture elements of the source image. Thus, each data value that is stored in the image data memory 5 can be designated for read-out from the memory by specifying the coordinates of the corresponding picture element in the source image.

Numeral 3 denotes a bar code detection section, for processing the bi-level data values from the bi-level conversion section 2 to obtain data representing a converted image in which each bar code region is represented by a corresponding single full-black region, with the remainder of the converted image being a white background, with substantially all black regions other than those corresponding to bar code regions being eliminated.

Numeral 4 denotes a bar code position detection section for deriving, from data representing a full-black region corresponding to a bar code region, produced from the bar code region detection section 3, the positions in the source image of a set of picture elements which extend continuosly along a central axis of a bar code region, i.e. along the direction of elongation of that region.

Numeral 6 denotes a bar code decoding section for reading out from the image memory 5 the data values corresponding to the aforementioned set of picture elements extending along the central axis of the bar code region, to thereby read the code data, and for decoding that data.

Figure 2A:
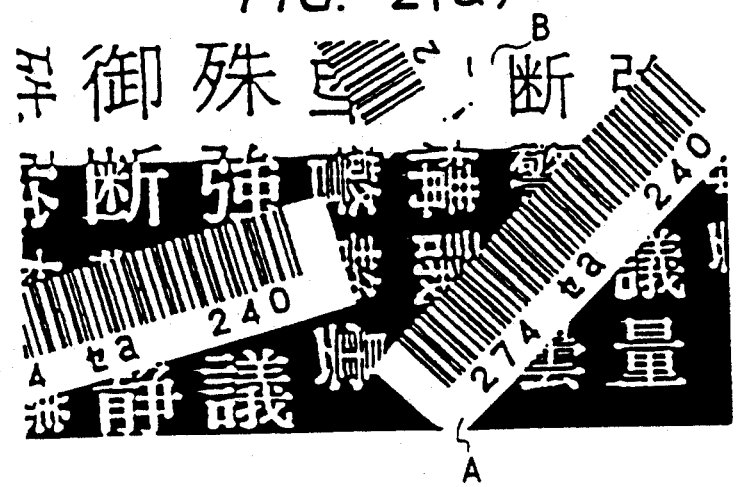
FIGS. 2(a) to (f) are diagrams for assistance in describing image processing operation that are executed by respective sections of the embodiment of FIG. 1(a)

The basic operation of this embodiment will be described referring to FIGS. to (f). FIG. 2(a) shows an example of a source image, in which two bar code regions (e.g. formed by bar code labels which are attached to an article from which the source image is obtained), each of elongated rectangular shape, appear at arbitrary positions and arbitrary inclinations. These bar code regions (one of which is designated as A in FIG. 2(a)) are superimposed on a background region (B) which includes various arbitrary black-and-white patterns and pattern portions. In order to decode the bar code, it is necessary to execute data processing operations which are equivalent to:

(a) extracting at least one of these bar code regions from the background B of the source image, and
(b) scanning the bar code region in a direction that is aligned with the direction of elongation of the bar code region and that intersects all of the bars, to thereby read the contents of the bar code data. The data can then be decoded, by any of various well-known methods, such as comparison with a code table, etc.

Figure 2B:
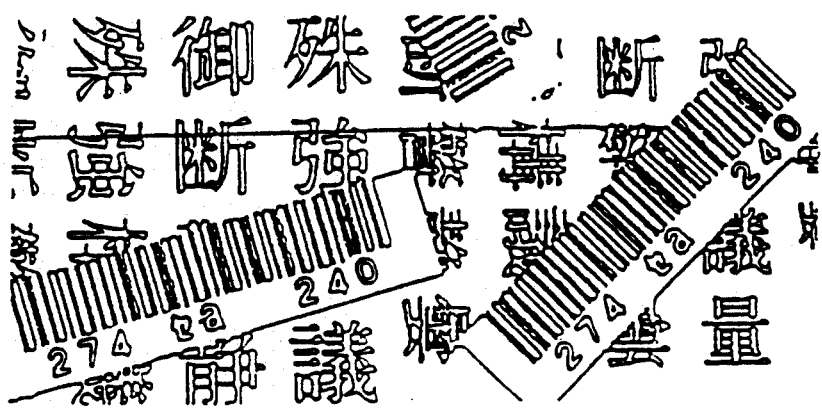

FIG. 2(b) illustrates the results of boundary line detection processing, which is applied to the bi-level data values produced from the bi-level conversion section 2, by the bar code region detection section 3. As shown, data are derived which represent a converted image in which only transitions between black and white regions of the source image appear.

Figure 2C:
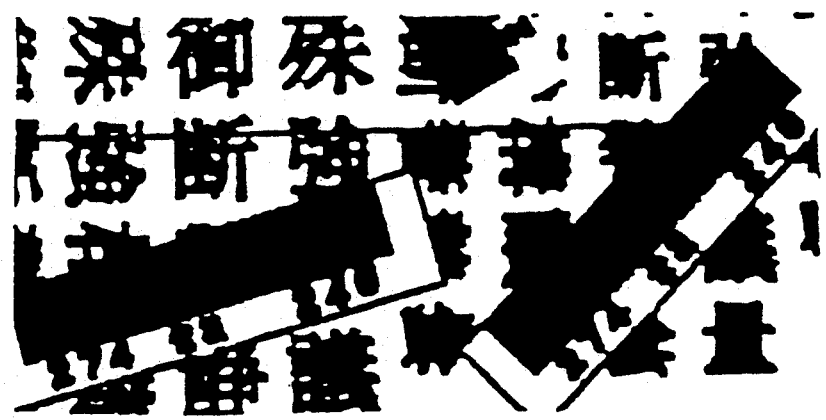
Figure 3A:
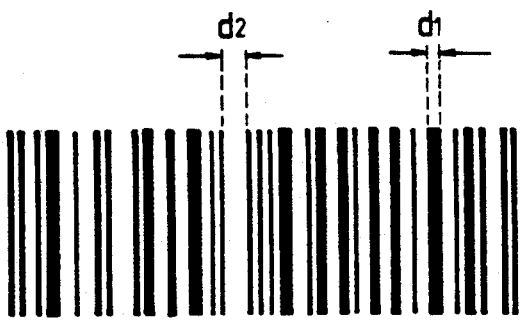
FIG. 3(a) shows an example of a bar code region.

FIG. 2(c) illustrates the results of black region expansion processing, which is executed by the bar code region detection section 3 after the boundary line detection processing of FIG. 2(b), the processing being based upon executing a logic OR operation on successive sets of data values of the converted image of FIG. 2(b), within a scanning window of size M×M picture elements (i.e. data values). That is, if at least one data value within the scanning window is in the "1" (i.e. black) state, then the corresponding data value in the converted image of FIG. 2(c) is set to the black state. With this processing, data are derived which represent a converted image in which the space between each pair of mutually adjacent boundary lines of the converted image of FIG. 2(b) is filled with black (i.e. 1 level) data values, if the distance between the pair of boundary lines is less than the predetermined value M (expressed as a number of picture elements). This predetermined value (whose magnitude is determined by the size of the aforementioned scanning window that is used in this processing) is made slightly greater than the maximum distance between any pair of mutually adjacent boundary lines wihtin a bar code region. FIG. 3(a) illustrates a portion of an example of a bar code label. If the distance $d_1$, (which is the width of a bar having maximum thickness, in the bar code) is greater than the distance $d_2$, (which is the maximum distance between any two adjacent bars), then the aforementioned predetermined value is made slightly greater than $d_1$. Conversely, if $d_2$ is greater than $d_1$, then that predetermined value is made slightly greater than $d_2$. In this way it is ensured that each bar code region in the converted image of FIG. 2(c) appears as a full-black region, whose shape, position and inclination correspond to those of the bar code region.

Figure 2D:
Figure 2E:
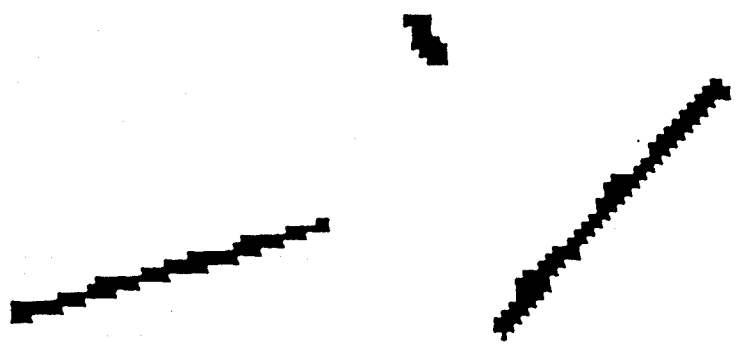
Figure 2F:
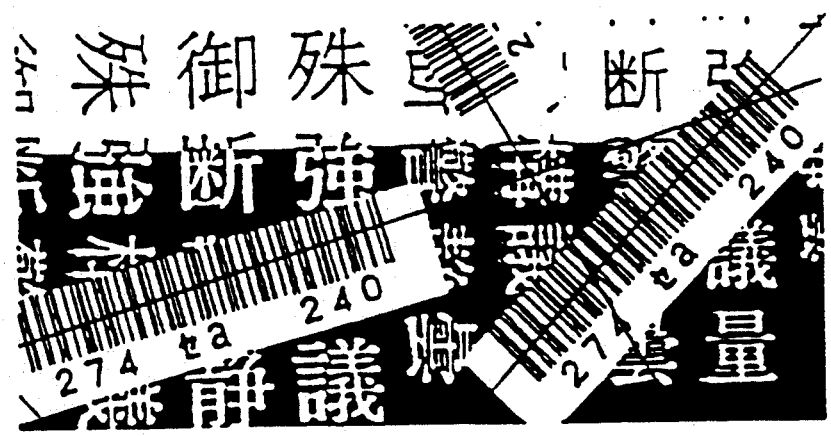

Next, as illustrated in FIG. 2(d), the data representing the converted image of FIG. 2(c) are subjected to black region contraction processing, to obtain data representing a converted image of the form shown in FIG. 2(e), with the processing results obtained in an intermediate stage being shown in FIG. 2(d). This is executed by again transferring successive data values of the converted image of FIG. 2(c) through a scanning window (which is substantially larger than that used for black region expansion), and applying the logic AND operation to the data values within the scanning window. The result of each such AND operation is set as the state of a corresponding data value in the converted image of FIG. 2(e). It can thus be understood that the black regions within the background in the converted image of FIG. 2(e) are of substantially reduced size, by comparison with the original source image of FIG. 2(a), whereas the black regions corresponding to the bar code regions are substantially unaffected. If all of the background black regions have not been eliminated at this stage, window OR processing can be repeated, to thereby obtain data representing a converted image from which substantially all of the background black regions have been eliminated, leaving a substantially all-white background. However, as shown, "skeleton" elongated black regions remain in the converted image of FIG. 2(e), each of which is of identical position and inclination to a corresponding one of the bar code regions of FIG. 2(a), and has a central position which is substantially identical to the central position of the corresponding bar code region, and a central axis of elongation defining a straight center line which is substantially identical to the central axis of elongation of the corresponding bar code region.

The above processing, for deriving data values representing the converted image of FIG. 2(e), are executed by the bar code region detection section 3 in FIG. 1(a).

Based on the center position of the "skeleton" black region and the inclination of the center line, together with the (known) total length of a bar code region, the bar code position detection section 4 derives the respective coordinates of a linear array of picture elements which extend along the center line of the "skeleton" black region and a bar code region. These data values are then read out from the image data memory 5. This process of reading out these data values from the image data memory 5 is of course directly equivalent to scanning along the bar code region, to read the code contents.

The data values thus read out from the image data memory 5, representing the bar code contents, are then supplied to the decoder section 6, to be decoded.

The above operations will be described in more detail in the following. As successive bi-level data values are produced from the bi-level conversion section 2 and stored in the image data memory 5 as described above, these data values are also supplied to the bar code region detection section 3. In the bar code region detection section 3, the data values are first supplied to a boundary line derivation section 7, which processes the data to detect transitions between black and white regions of the source image. The bar code region detection section 3 thereby generates successive bi-level data values which, when all of the source image data values have been processed by the bar code region detection section 3, represent a converted image having the form shown in FIG. 2(b). As described above, this contains no full-black regions, and consists only of boundary lines, which correspond to the aforementioned transitions between black and white regions of the source image.

In the prior art, such image processing to convert to a boundary line image is executed by using the Laplace transform. However with this embodiment of the invention, the processing is executed in a very simple manner, by using a scanning window such as a 2×2 scanning window as described in detail hereinafter. Designating a set of data values of the source image which currently appear within this 2×2 scanning window as D11, D12, D21 and D22 respectively, a corresponding data value D11 of the converted image is obtained by executing the logic operation:

$$(D11 \times D12 \times D21 \times D22) \cdot (\overline{D11 \cdot D12 \cdot D21 \cdot D22})$$

The data values thus obtained by the bi-level variation detection section 11, representing a boundary-line converted image having the form shown in FIG. 2(b), are then successively supplied to a black region expansion section within a region derivation section 8 of the bar code region detection section 3. The basic function of the region derivation section 8 is to extract at least one bar code region from the background region B shown in FIG. 2(a). The black region expansion section 12 executes processing, by applying the aforementioned logic OR processing of data values in an M×M scanning window (described in detail hereinafter), to obtain data values which represent a converted image in which the space between each mutually adjacent pair of boundary lines shown in FIG. 2(b) is "filled in" in black, if the separation between the pair is less than a predetermined value, as described above.

The data values which thus result from processing by the black region expansion section 12, representing a converted image of the form shown in FIG. 2(c), are successively supplied to the black region contraction section 13, which executes the aforementioned black region contraction processing to obtain data representing a converted image of the form shown in FIG. 2(e), by executing logic AND operations on data values within an N×N scanning window (described in detail hereinafter). In order to ensure maximum elimination of background black regions other than bar code region "skeleton" black regions of the form shown in FIG. 2(e), the value of N is selected such as to ensure that a full-black "skeleton" of thin elongated shape will remain for each of the bar code regions.

Figure 3B:
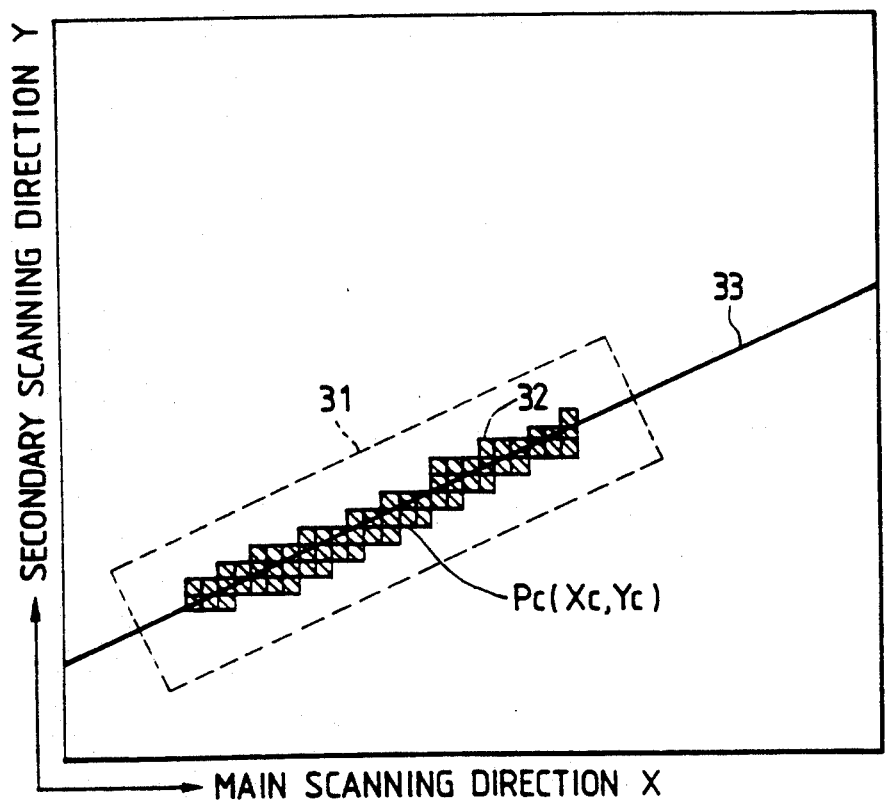
FIG. 3(b) is a diagram for describing how center position coordinates and a center line inclination value for a bar code region are obtained from a "skeleton" black region derived from a bar code region by the embodiment of FIG. 1(a)

Data values representing one or more of these "skeleton" black region black regions are then supplied to a slope and center position computing section 9 in the bar code position detection section 4. The slope and center position computing section 9 then computes, for one or more of these black regions, the coordinates of the center position of that black region, as illustrated in FIG. 3 (b). Here, a "skeleton" black region 32 has been derived by the black region contraction section 13, from a bar code region designated by numeral 31. Since the black region contraction processing that is executed by the black region contraction section 13 will operate on the bar code region in a symmetrical manner, with respect to the two pairs of opposing sides of the bar code region, the center point Pc of the "skeleton" black region, having coordinates (Xc, Yc), will be substantially identical to the center point of the corresponding bar code region. In addition, a straight line 33 which is aligned with the central axis of elongation of the "skeleton" black region will be substantially identical to the central axis of elongation of the bar code region 31. Thus, the center line 33 is suitable for scanning the bar code region 31 to read the bar code contents. The center line 33 is defined by the center point Pc (Xc, Yc) and by the inclination (designated in the following as k) of the center line. These are computed by the slope and center position computing section 9, and supplied to the read-out coordinates computing section 10. The read-out coordinates computing section 10 then computes the respective coordinates (i.e. with respect to the main scanning direction and the secondary scanning direction of the source image) of a linear array of picture elements which extend from a point $P_0$ to a point $P_{(L-1)}$ shown in FIG. 3(b), i.e. from one end of the bar code region 31 to the opposite end, along the center line 33.

These coordinates are then supplied to the image data memory 5, to read out the corresponding data values, and hence read the contents of the bar code, which are then supplied to the decoder section 6 to be decoded.

FIG. 4 is an operation flow chart for illustrating the process of deriving the slope k and the center point coordinates (Xc, Yc) by the slope and center position computing section 9, based on the output data values produced from the bar code region detection section 3. In a first step I, initial values are set in a picture element counter n, an addition register A (for the x-coordinates of black picture elements, along the main scanning direction), an addition register B (for the x-coordinates of black picture elements, along the secondary scanning direction), an x,y addition register C, and an x.x addition register D. Successive ones of the picture element data values produced from the black region contraction circuit are then inputted consecutively. In step II, a decision is made as to whether the last data value to be inputted represents a black picture element. In step III, the contents of the registers A, B, C and D are updated. In step IV, the slope k and the center position Pc coordinates (Xc, Yc) are computed.

If in the decision step II, the black state is detected, then the contents of A, B, C and D are correspondingly updated in step III. In step IV, the values of the contents of the registers A, B, C and D are used to obtain the center line (as described hereinabove) of a "skeleton" black region corresponding to a bar code region, to obtain the center coordinates (Xc, Yc) for that bar code region.

For simplicity of description, it has been assumed in the above that only one "skeleton" black region remains in the data produced from the black region contraction circuit 13. If there are a plurality of black regions represented in that data, then it will also be necessary to confirm, for each newly detected black picture element, that either the y-coordinate or x-coordinate of that element is equal to that of the immediately precedingly detected black picture element, incremented by one. This will ensure that elements extending along a single region are detected.

In this first embodiment, as described above, all of the data values that are produced from the bar code region detection section 3 are utilized by the slope and center position computing section 9 for computing the slope k and the center point coordinates. However it should be noted that it would be equally possible to insert a second boundary line derivation section as the first stage of the bar code position detection section 4, i.e. prior to the slope and center position computing section 9, and to thereby derive data values representing a converted image in which only the boundary lines (i.e. transitions between black and white regions) of the expanded black region image (of FIG. 2(c)) appear. The above processing to derive the slope k and the center point coordinates could then be executed as described above, but using these data values representing a boundary line image.

The processing executed by the read-out coordinates computing section 10 to obtain the coordinates of the linear array of picture element positions extending from point $P_0$ to point $P_{(L-)}$, that have to be read out from the boundary line derivation section 7 in order to read and decode the bar code, is as follows. Designating that array of read-out points as $\{P_i\}$, with respective coordinates (Xi, Yi), and the length of a bar code region as a number L of picture elements, then when the slope k is <1, the coordinates are obtained as:

$$Xi = [(Xc - L/2) + i]$$

$$Yi = [Yc - L/2) + i \cdot k]$$

while if k>1, then,
$$Xi = [(Xc - L/2) + i/k]$$

$$Yi = [Yc - L/2) + i] \quad (i = 0, L - 1)$$

In the above, the [ ] indicate that the quantity therein is rounded off to an integer value.

When the above set of coordinates have been computed by the read-out coordinates computing section 10, the corresponding data values are read out from the image data memory 5, as the contents of the bar code, and are supplied to the decoder section 6 to be decoded.

Thus with the first embodiment described above, a bar code region is separated from the background of the source image by converting the bar code region into a corresponding full-black region within a converted image, then the center position and the inclination of a central axis of that full-black region are derived, and used to, in effect, scan along the bar code region to read the code contents. It can be understood that this embodiment of the invention enables a bar code to be reliably decoded, even if the bar code is formed on one or more bar code labels that are disposed at arbitrary positions and aribtrary inclinations within a source image.

Figure 1B:
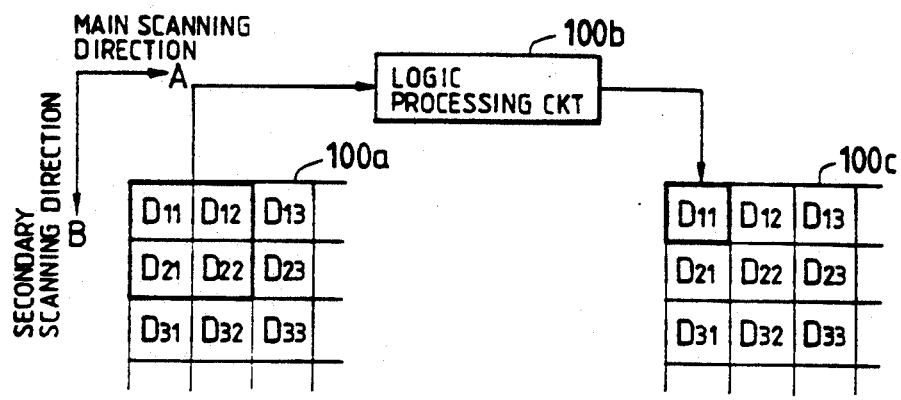
FIGS. 1(b) to 1(l) are diagrams for assistance in describing the operation of circuit blocks in a bar code region detection section shown in FIG. 1.
Figure 1C:
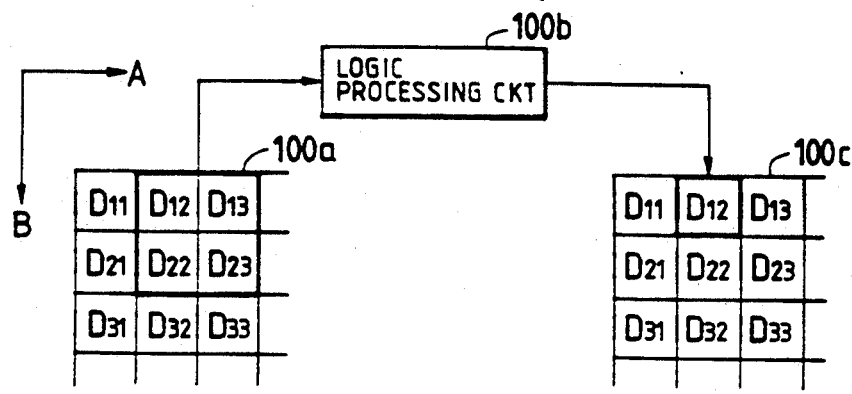
Figure 1D:
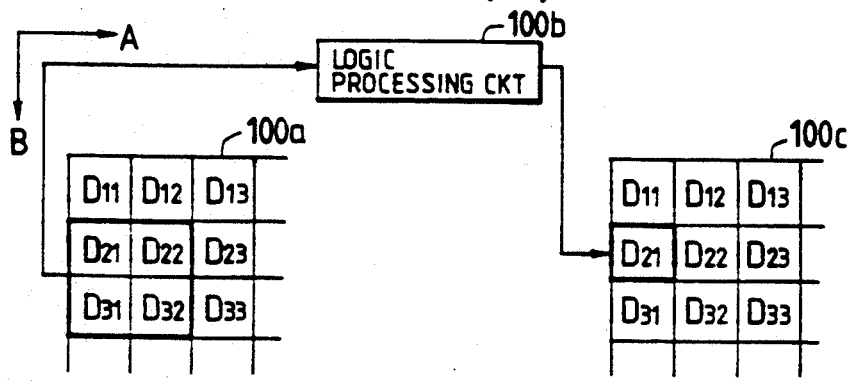

Details of the configuration and operation of the bi-level variation detection section 11, black region expansion section 12 and black region contraction section 13 of FIG. 1(a) will be described in the following. FIGS. 1(b), 1(c) and 1(d) are diagrams for describing the basic operation of respective scanning windows that are utilized in the bi-level variation detection section 11, black region expansion section 12 and black region contraction section 13. Such scanning windows are known in the prior art, described for example in U.S. Pat. No. 4,551,768, so that only a brief description will be given. 100a denotes an input memory for storing the picture element data values supplied from a preceding section, and is a 2-dimensional memory array (i.e. forms a 2-dimensional memory space). A logic processing circuit 100b executes logic processing for the respective one of the bi-level variation detection section 11, black region expansion section 12 and black region contraction section 13, and detailed description will be omitted. An output memory 100c stores data values obtained by processing by the logic processing circuit 100b. As in the case of the memory 100z, the memory 100c is a 2-dimensional memory array.

It will be assumed in the following for the purpose of description that a 2×2 scanning window is used.

Firstly, as shown in FIG. 1(b), a set of data values d11, d12, d21, d22 are read out from the first two lines of data values stored in the memory 100a, and are processed by the logic processing circuit 100b (e.g. by executing a logic AND or OR operation on the data values), and the resultant data value is stored in a memory location D11 in the output memory 100c, i.e. in a memory location corresponding to the location D11 in the input memory 100a. Next, a set of four picture element data values which are displaced with respect to the first-mentioned set by one position along the main scanning direction are read out from the memory 100a (i.e. the data values d12, d1, d22, d23), similarly processed by circuit 100b, and the result stored in location d12 of the output memory 100c (i.e. correponding to the position d12 in the input memory 100a).

When all of the picture element data values of the first two lines have been processed in this way, a shift by one position along the secondary scanning direction is executed to begin reading out from the input memory 100a successive sets of four data values, beginning with the set d21, d22, d31, d32, as shown in FIG. 1 (d), with the processing result in this case being stored at location d21 of the output memory 100c.

This is executed until all of the data values of the input memory 100a have been processed in the scanning window. It will be apparent that in some cases, e.g. when a rightmost position (as viewed in the drawings) of a picture element line along the main scanning direction is reached, there will be insufficient data values to input to the scanning window. However this can easily be solved by using interpolated data values.

Figure 1E:
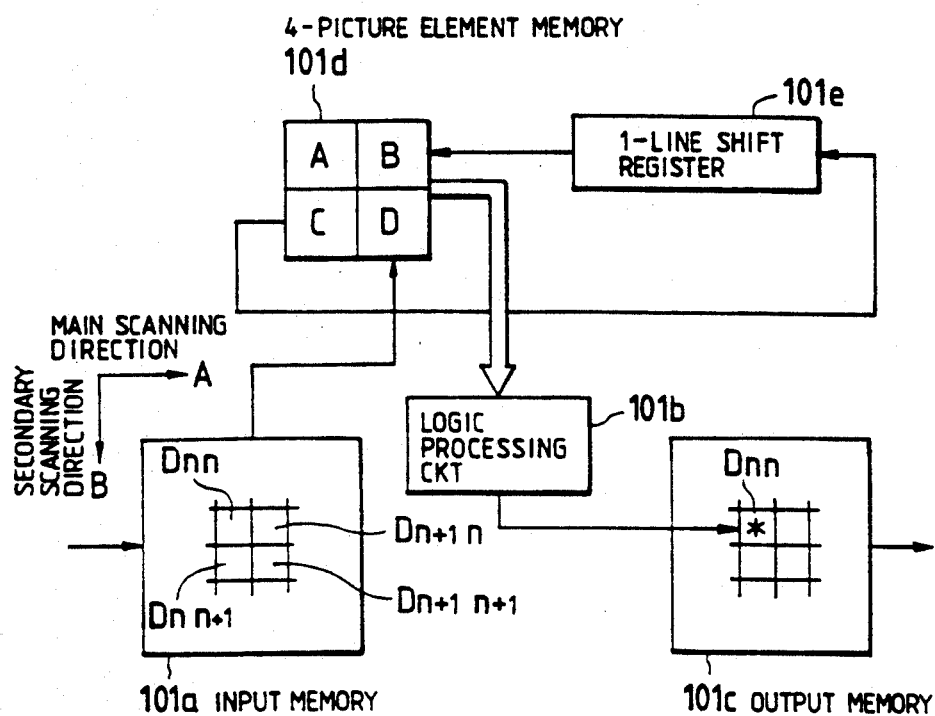

The operation of the bi-level variation detection section 11 of FIG. 1(a) will be described referring to FIGS. 1(e) and 1(f). In FIG. 1(e), 101a denotes an input memory for storing the bi-level data values that are produced from the bi-level conversion section 2, which is a 2-dimensional memory array. Numeral 101b denotes a logic processing circuit, having the configuration shown in FIG. 1(f), i.e. formed of OR gates 101f to 101h, AND gates 101i to 101s, a NAND gate 101k, and an AND gate 101m. An output memory 101c stores results obtained from the logic processing circuit 101b, and is also a 2-dimensional memory array. A 4-picture element memory (i.e. 4-data value) memory 101d corresponds to a 2×2 scanning window as described hereinabove. A shift register 101e functions as a 1-line memory. The operation of this circuit is as follows. Firstly, the bi-level data values from the bi-level conversion section 2 are successively stored in the input memory 101a. These data values are thereafter successively read out from the memory 101a, one at a time in synchronism with a clock signal (not shown in the drawings), to be stored at position D of the 4-picture element memory 101d. Immediately prior to each such transfer of a data value from the memory 101a to the 4-picture element memory 101d, the data value which was held in location D of the 4-picture element memory 101d is transferred to the location C, while the data value which was at position C is transferred to the input of the one-line memory 101e, an output data value from the one-line memory 101e is transferred to position B of the 4-picture element memory 101d, and the value which as stored at the B position is transferred to the A position.

Figure 1F:
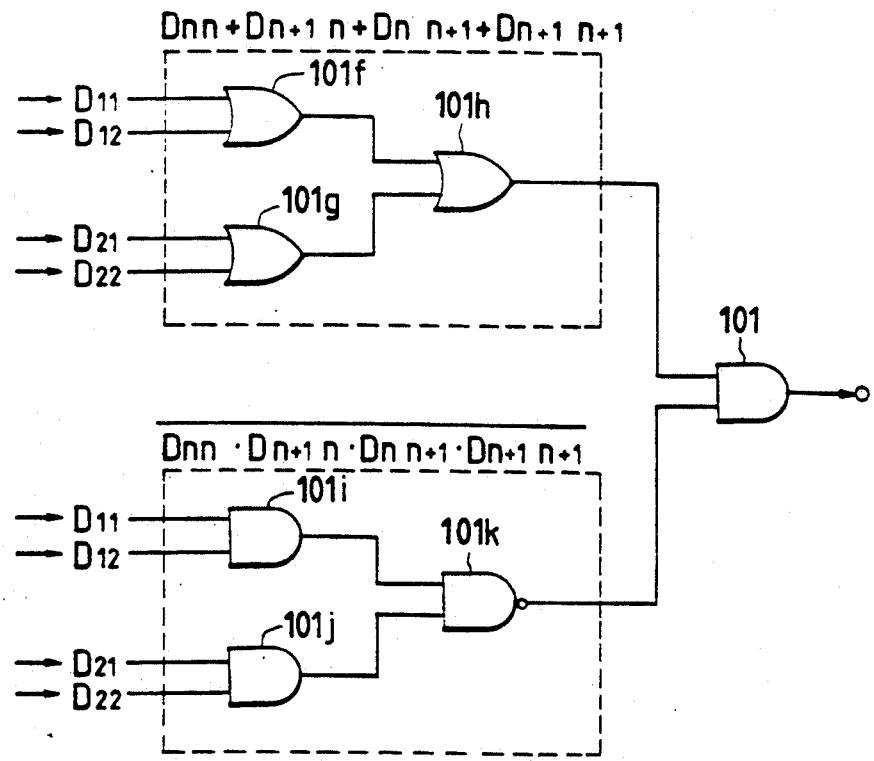

The four values which are now held in the 4-picture element memory 101d (e.g. the values $D_{n,n}$, $D_{n+1,n}$, $D_{n,n+1}$, $D_{n+1,n+1}$ from the $n^{th}$ and $(n+1)^{th}$ lines of the input memory 101a) are then supplied to the logic processing circuit 101b, and logic processing is then executed by the circuit shown in FIG. 1(f). That is, the logic sum $(D_{n,n}+D_{n+1,n}+D_{n,n+1}+D_{n+1,n+1})$ is derived by the gates 101f to 101h, while the logic product $(D_{n,n} \cdot D_{n+1,n} \cdot D_{n,n+1} \cdot D_{n+1,n+1})$ is obtained by the gates 101i to 101k. The logic product of the outputs from the gates 101h and 101k is then obtained by the gate 101m.

If all of the data values currently held in the 4-picture element memory 101d are in the 1 state (i.e. all-black picture element state) or are all in the 0 state (i.e. all-white picture element state), then a 0 output is produced from the gate 101m. In any other case, i.e. if one or more data values held in the 4-picture element memory 101d represent the white state and one or more data values represent the black state, then a 1 output is produced from the gate 101m.

The resultant value from the gate 101m is then stored in the output memory 101c, at a position corresponding to the position $D_{n,n}$ of the input memory 101a.

Figure 1G:
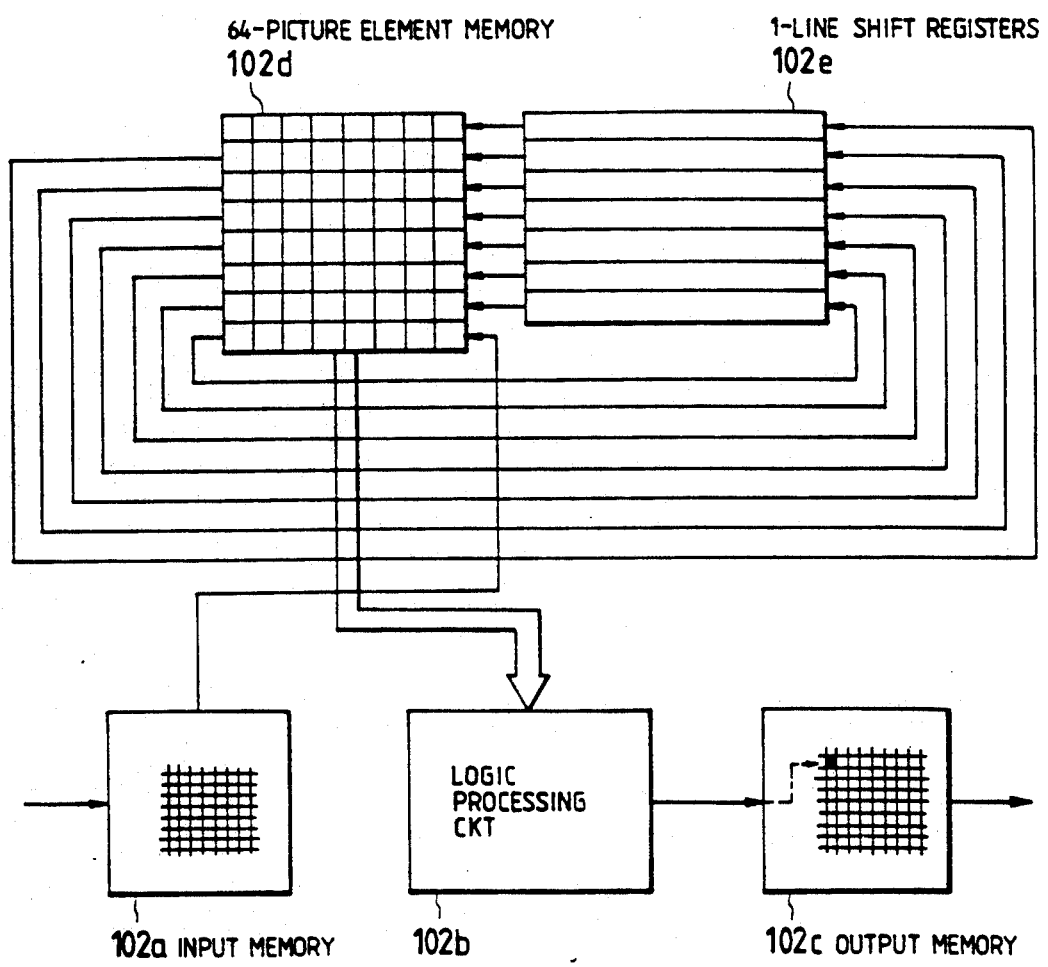
Figure 1H:
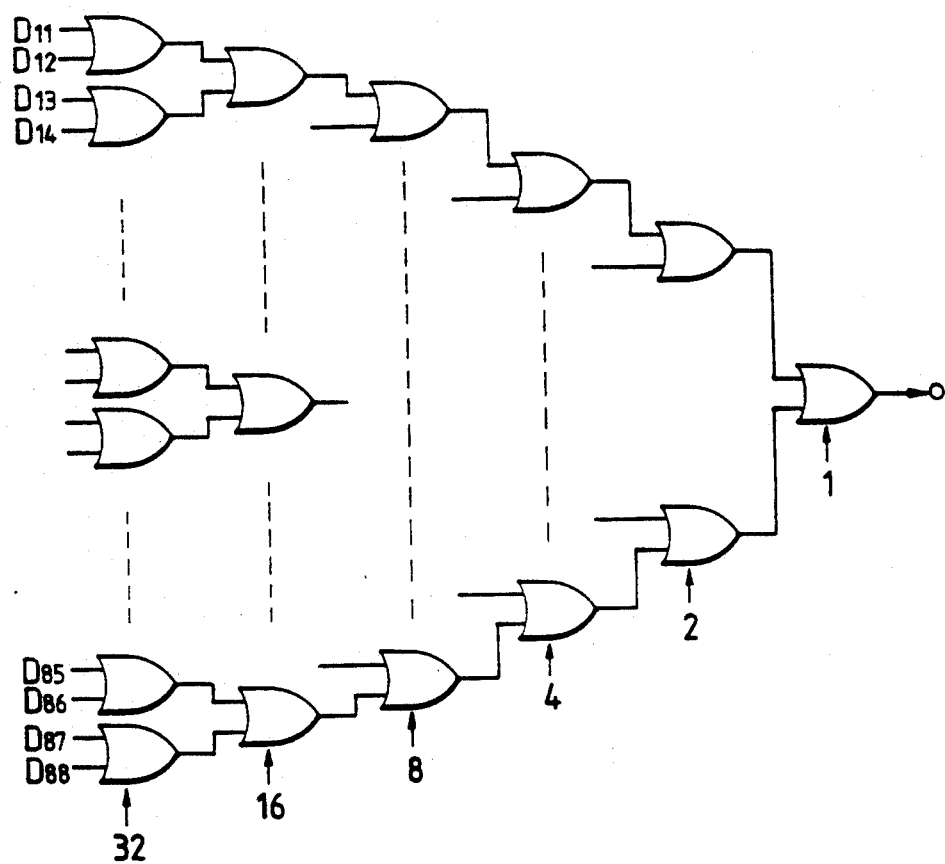

The operation of the black region expansion section 12 will be described referring to FIGS. 1(g) and 1(h). In FIG. 1(g), 102a denotes an input memory, of the type described for FIG. 101e, into which the processing results held in the output memory 101c of FIG. 101e are transferred and stored. 102b denotes a logic processing circuit, having the configuration shown in FIG. 1(h), i.e. formed only of OR gates. An output memory 102c stores processed results produced from the logic processing circuit 102b, and is as described for the output memory 101c in FIG. 1(e). A 64-picture element (i.e. 64 data value) memory 102d corresponds to an 8×8 scanning window. 102e denotes a set of seven shift registers, functioning as respective one-line memories.

The operation of this circuit is as follows. The basic configuration is similar to that of the circuit of FIG. 1(e), so that detailed description will be omitted. The logic processing circuit 102b derives the logic sum of all of the inputs applied thereto. If at least one of the data values which are currently held in the 8×8 scanning window (i.e. the memory 102d) is in the 1 state (indicating an all-black picture element state), then a 1 state output is produced from the logic processing circuit 102b. Otherwise, a 0 state output is produced. Each output result from the logic processing circuit 102b is stored in a location of the memory 102c, to thereby executed black region expansion processing as described hereinabove.

Figure 1I:
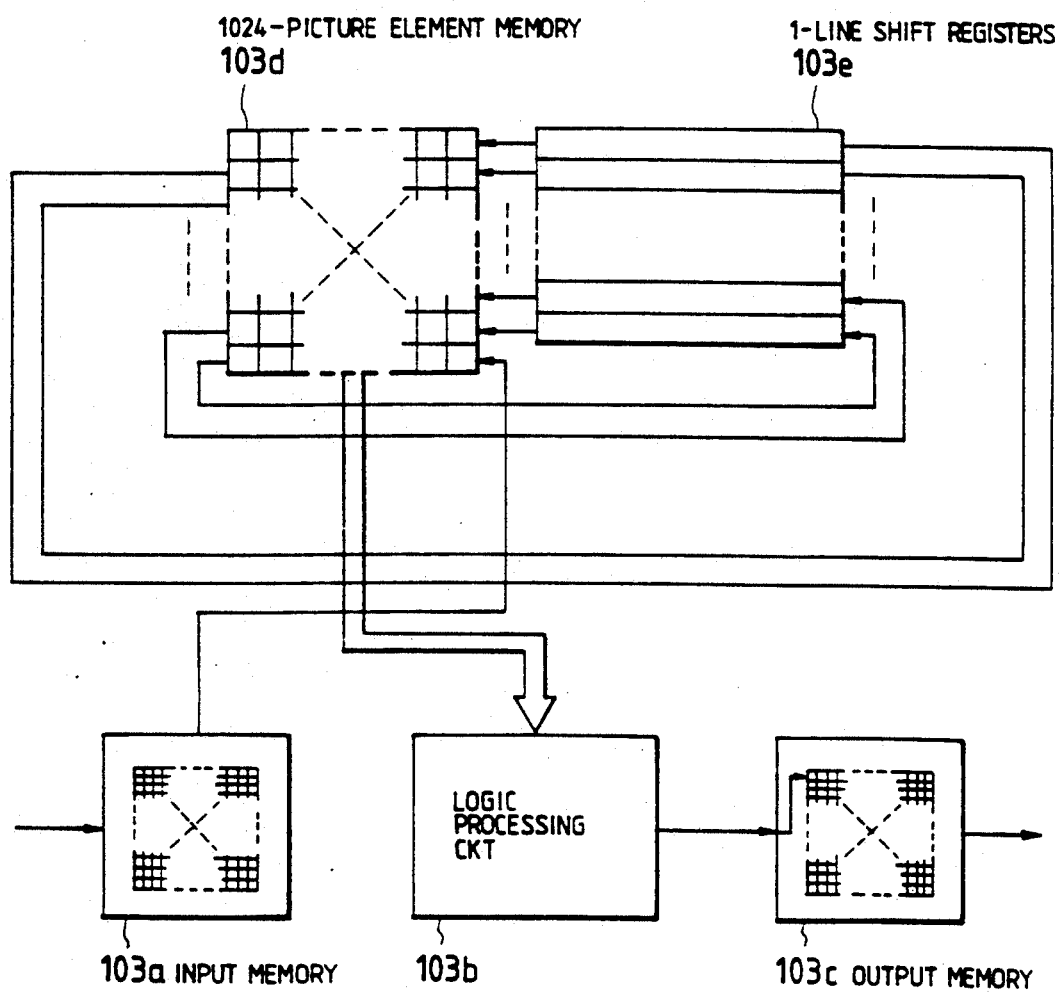
Figure 1J:
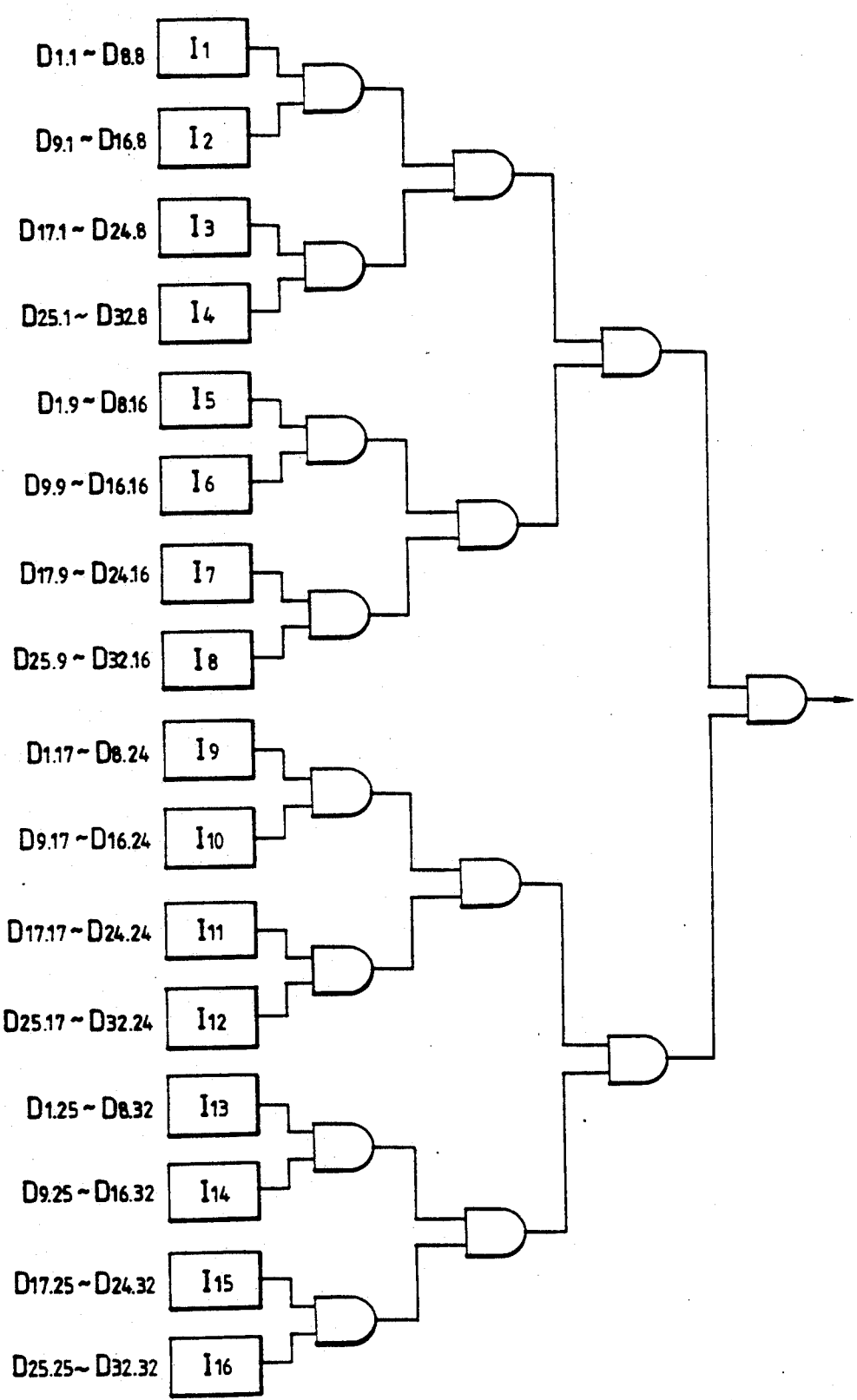
Figures 1K, 1L:
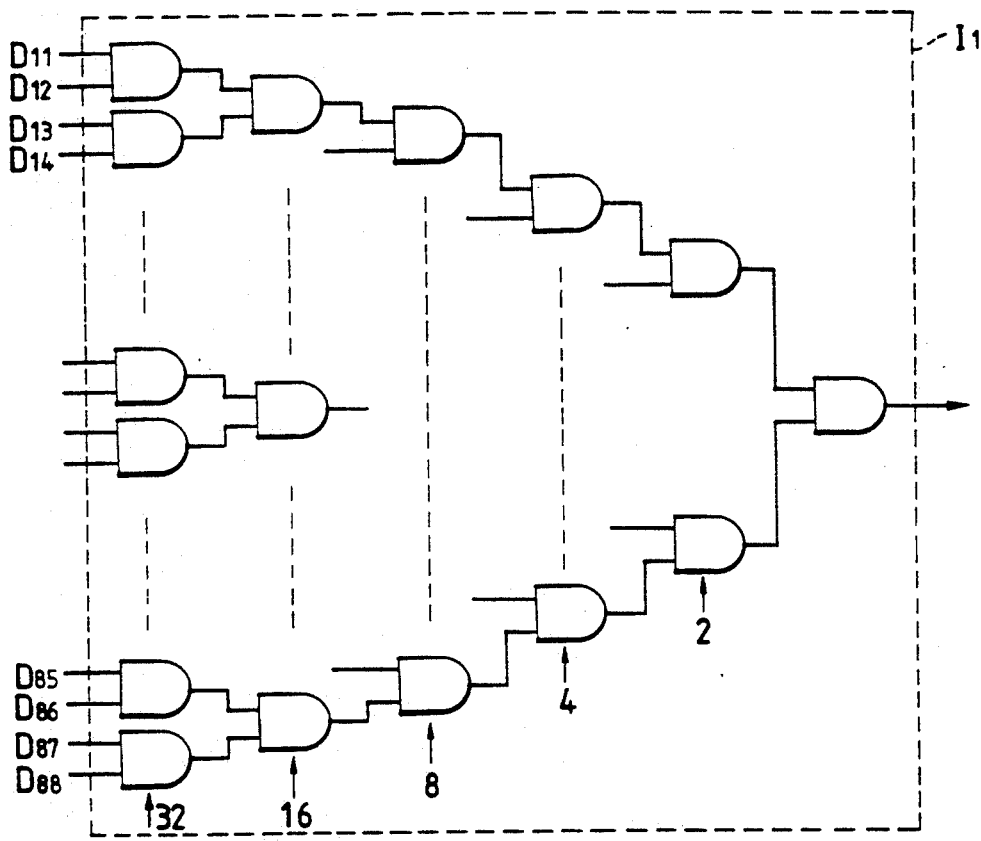

The black region contraction section 13 will be described referring to FIGS. 1(i) to 1(l). In FIG. 1(i), 103a is an input memory, similar to that of FIG. 1(e), which receives and stores the processed results held in the output memory 102c of FIG. 1(g). A logic processing circuit 103b has the circuit configuration shown in FIG. 1(j), and is formed only of AND gates. In FIG. 1(j), each of the blocks $I_1$ to $I_{16}$ is formed as shown in FIG. 1(k), being formed of a set of AND gates. An output memory 103c stores the processing results obtained from the logic processing circuit 103b. A 1024 picture element memory 103d corresponds to a 32×32 scanning window, with the window configuration being as shown in FIG. 1(l). 103e denotes a set of 31 shift registers, functioning as respective one-line memories.

The basic operation of this circuit is similar to that of FIG. 1(e), so that detailed description will be omitted. It will be apparent that if all of the data values currently held in the 1024-picture element memory 103d are in the 1 state (i.e. black picture element state), then a 1 state output will be produced from the logic processing circuit 103b, and stored in the output memory 103c. Otherwise, a 0 state output will be produced from the logic processing circuit 103b and stored in memory 103c. In this way, black region contraction is achieved.

A second embodiment of the present invention will be described, referring to FIG. 5, which is a partial conceptual system block diagram of this embodiment. The second embodiment differs from the first embodiment with respect to the bi-level conversion section 2, and the remaining parts of the embodiment are identical to the first embodiment, so that further description will be omitted. In the bi-level conversion section 2 of the second embodiment, the data values representing the source image that are applied to the input terminal 1 are converted to bi-level values by a bi-level conversion circuit 21, and the resultant bi-level values are supplied to a variable data reduction circuit 22. The variable data reduction circuit 22 functions to reduce the scanning line density and the density of picture elements in each scan line by equal amounts, with the amount of density reduction being variable in accordance with a density reduction value that is applied to an input terminal 23. That is to say, a certain proportion of scanning lines of the input image signal (e.g. one in every five lines) are eliminated by transfer through the variable data reduction circuit 22, while in addition the same proportion of picture element data values (e.g. one in every five data values) are also eliminated. Designating the variable density reduction value applied to the input terminal 23 as A, density reduction by a factor A/B is produced, where B is a parameter that is fixedly set within the variable data reduction circuit 22. That is, for every B data values that are inputted, only a number A of these is selected to be outputted.

Figure 7:
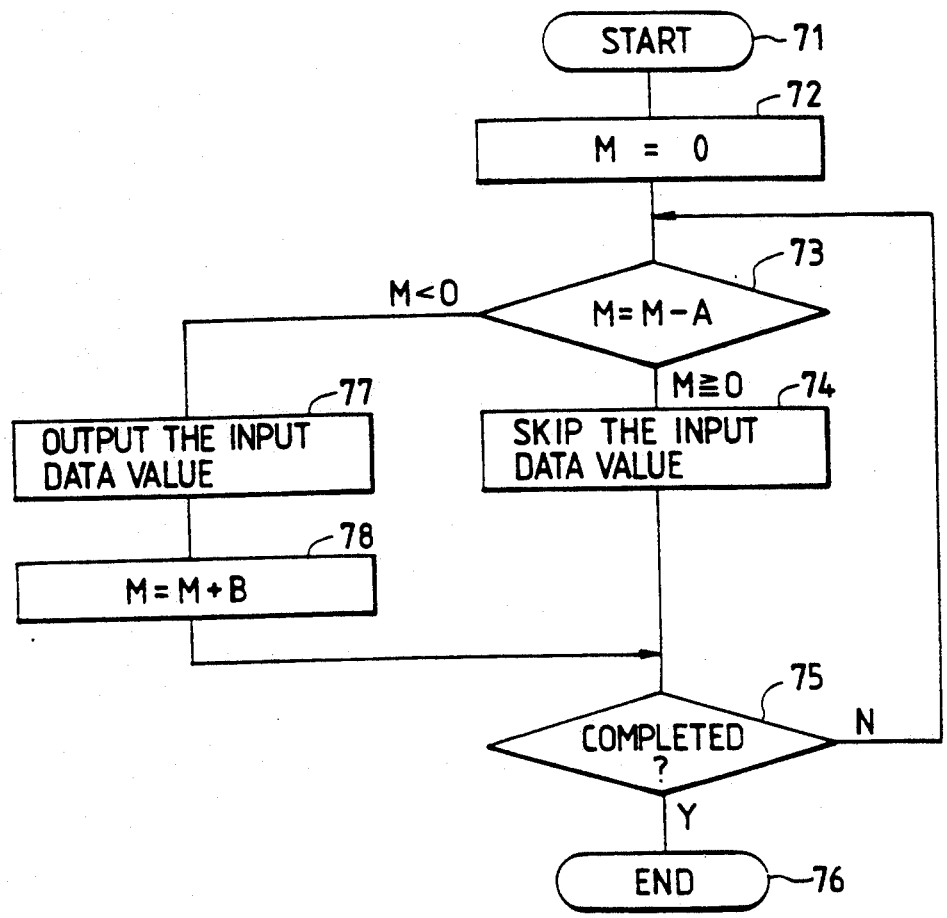
FIG. 7 is an operation flow chart for the bi-level conversion section of the second embodiment.
Figure 8A:
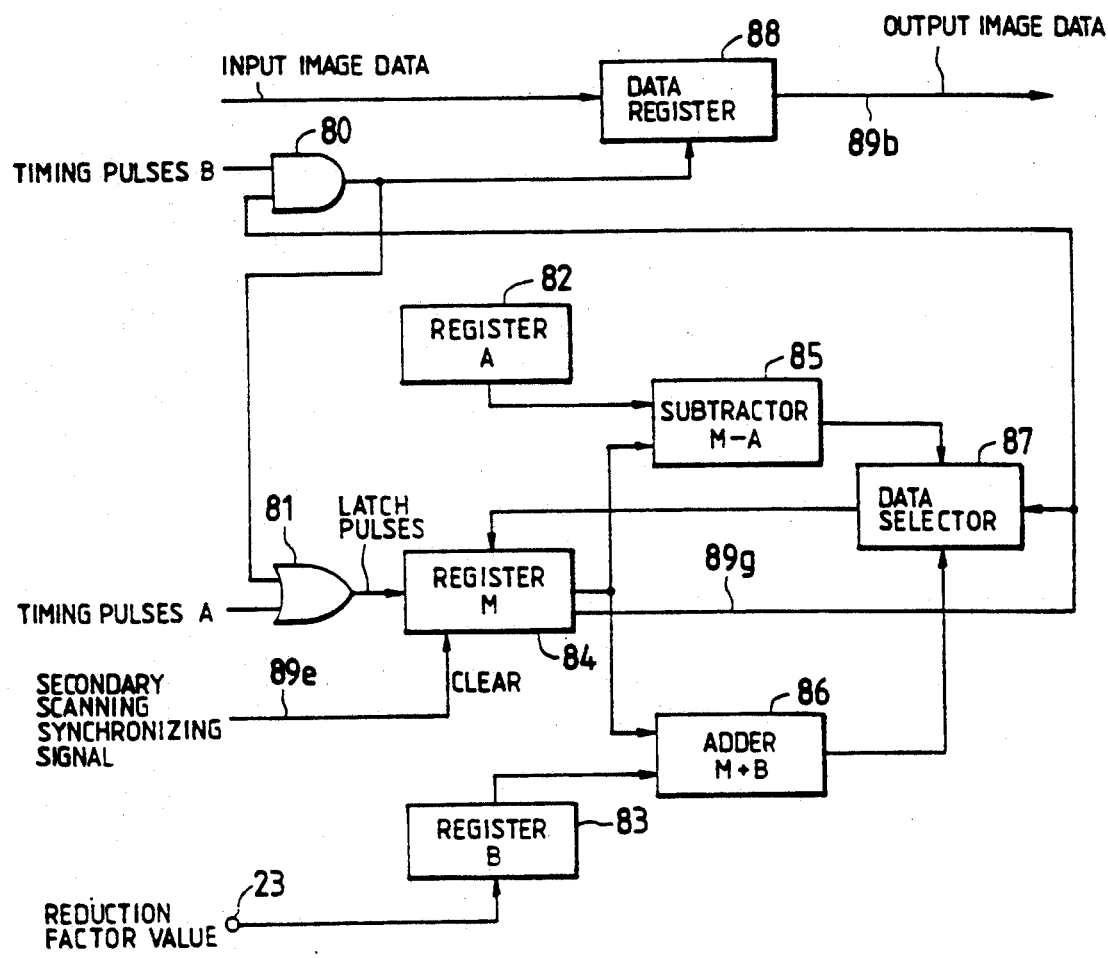
FIG. 8(a) is a detailed block diagram of a data reduction circuit in the bi-level conversion section of the second embodiment.

The operation of the second embodiment is as follows. The conversion circuit 21 is a simple bi-level conversion circuit, utilizing a fixed threshold level, or a threshold level that varies in accordance with the input image signal level. The variable data reduction circuit 22 utilizes known technology, with the operation of that circuit being illustrated in the flow chart of FIG. 7. An example of a specific circuit within the variable data reduction circuit 22 for executing density reduction along the main scanning direction (i.e. for "thinning out" the number of data values in each scan line of the input image signal) is shown in FIG. 8(a), and a corresponding timing diagram in FIG. 8(b). Designating the density reduction factor that is achieved by the circuit as A/B, the input image signal data values are selectively outputted or inhibited from being outputted from the variable data reduction circuit 22 as follows, referring to FIG. 7. After the start of operation (step 71), a processing step 72 is executed in which a register, designated as M, is cleared. When a first data value is supplied from the bi-level conversion circuit 21, then in a decision step 73, the contents of register M are decremented by a fixed value A, and a decision is made as to whether the result is greater than or equal to zero. If so, a processing step 74 is executed, in which the aforementioned data value is skipped, i.e. is not outputted from the variable data reduction circuit 22. Next, in a decision step 75, a decision is made as to whether all of the data values of the source image have been processed. If all of the data values have been processed, then processing ends at step 76. If not, then operation returns to the step 73.

If it is found in the decision step 73 that the contents of the M register are negative, then a processing step 77 is executed, in which the current data value is outputted from the variable data reduction circuit 22. In the next step 78, the contents of the M register are incremented by a value B, and operation proceeds to the decision step 75. In a practical apparatus, the input image signal supplied to the input terminal 1 consists of successive digital data values, each corresponding to a specific picture element of the source image, which occur as successive sets of data values of successive scanning lines of the source image, with each set extending along the main scanning direction. Successive scanning lines extend along the secondary scanning direction. The flow chart of FIG. 7 has been described above in terms of units of picture elements, with the operations executed in steps 74 and 77 serving to achieve density reduction by a factor A/B along the main scanning direction. However a similar operating flow is also executed by the variable data reduction circuit 22 to achieve density reduction along the secondary scanning direction, i.e. in units of scanning lines, with the density reduction factor also being A/B in this case.

Figure 8B:
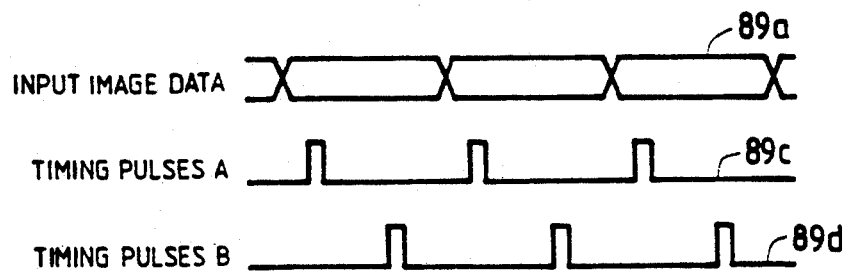
FIG. 8(b) is a corresponding timing diagram.

Referring to FIG. 8(a) and 8(b), waveform (a) in FIG. 8(b) represents the input data values that are supplied to the variable data reduction circuit 22 from the bi-level conversion circuit 21, waveform (b) shows a timing pulse train which is synchronized with these data values, and waveform (c) shows a timing pulse train B which is phase-displaced from the timing pulses A. The bi-level data values from the bi-level conversion circuit 21 are supplied over a signal line 89a, and the output data values from the circuit of FIG. 8 appear on a signal line 89b. The terminal points B are supplied over a signal line 89c, and the timing pulses A are supplied over a signal line 89d. A secondary scanning synchronizing signal which is supplied on a signal line 89e consists of pulses which are respectively produced at the end of each set of data values corresponding to a line of picture elements (along the main scanning direction) of the source image. An AND gate 80 produces as output the logic product of the timing pulses B and an output signal from a register 84 (described hereinafter). An OR gate 81 generates the logic sum of the timing pulses A from signal line 89d and the output signal from the AND gate 80. A register 82 holds the fixed value A, while a register 83 holds the value B which is supplied from an external source, from a set of parallel input terminals 23, and which can be varied in order to vary the reduction factor A/B described above. A register 82 holds the value M, and is cleared each time a secondary scanning synchronizing pulse is applied over signal line 89e, and which latches the state of the output signal from a data selector 87 (described hereinafter) in response to an output pulse from the OR gate 81. The register 84 outputs, on a signal line 89f, the data held therein, together with a sign bit for that data. Register 84 also produces on a signal line 89g the sign bit alone. A subtractor 85 subtracts the contents of the register 82 from the contents of the register 84, and outputs the result. An adder 86 adds together the contents of the register 84 and the register 83, and outputs the result. The data selector 87 serves to select the output from adder 86 to be outputted therefrom, if the sign bit that appears on the signal line 89g is in the 1 state, i.e. if the contents of the register 84 are negative. Otherwise, the data selector 87 selects the output from the subtractor 85 to be outputted therefrom. A data register 88 latches each input data value from the signal line 89a in response to an output pulse from the gate 80, and produces that data value as output on the signal line 89b.

The operation of this circuit is as follows. When the contents of the register 84 are positive, the signal line 89g will be at the 0 logic level, so that the timing pulses B of signal line 89c will be inhibited from being produced from the gate 80. Thus, the contents of the data register 88 are not updated. Since the data selector 87 produces the output from the subtractor 85 in this case, the contents of the register 84 will become equal to (M-A), when a terminal point is applied on signal line 89d. If the contents of the register 84 become negative, then the signal line 89g will go to the 1 logic level, so that the timing pulses B from signal line 89c will be transferred by the gate 80, so that the contents of the data register 88 will be updated, i.e. will become the currently inputted data value from signal line 89a. In this case, the data selector 87 transfers the output from the adder 86, so that the contents of register 84 will become (M+B) when a B timing pulse is applied on signal line 89c.

With the second embodiment described above, since the scan line density (and, correspondingly, the density of data values in each scan line) of the data that are supplied to the bar code region detection section 3 can be varied by adjusting the valve B that is inputted from input terminals 23, and hence can be set to a fixed value of scan line density, it becomes possible to execute operation of the apparatus based on a fixed value of scan line density, irrespective of the scan line density of the input image signal that is supplied to the input terminal 1. That is to say, the apparatus can operate from input image signals having various different values of scan line density, without the need to change such image processing parameters as the scanning window size, etc.

A third embodiment of the present invention will be described, referring to FIG. 6, which is a partial conceptual system block diagram of this embodiment. The third embodiment differs from the first embodiment only with respect to the bi-level conversion section 2, and the remaining parts of the embodiment are identical to the first embodiment, so that further description will be omitted. In the bi-level conversion section 2 of the second embodiment, the data values representing the source image that are applied to the input terminal 1 are converted to bi-level values by a bi-level conversion circuit 21, and the resultant bi-level values are supplied to a interpolation circuit 24. The resultant output from the interpolation circuit 24, comprising successive data values of the input image signal with additional interpolated data values inserted periodically by linear interpolation, is transferred to a variable data reduction circuit 22, which functions as described hereinabove for the second embodiment.

Figure 9:
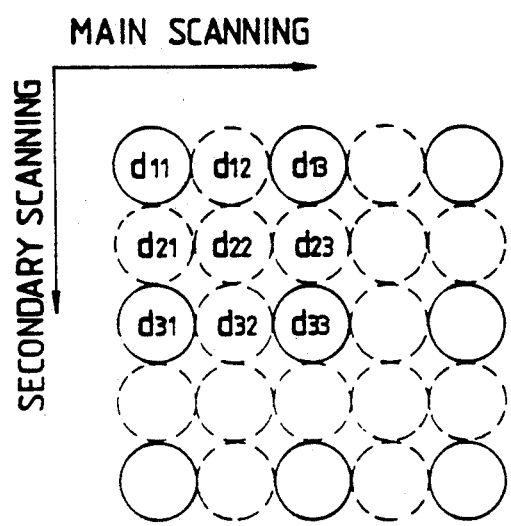
FIG. 9 is a conceptual diagram for describing an interpolation operation executed by the bi-level conversion section of the third embodiment.

The interpolation circuit 24 repetitively executes linear additive averaging computations on the input (multi-level) data values that are supplied to the input terminal 1, to obtain interpolated values, and so can be implemented in a simple manner. FIG. 9 shows an example of such interpolation, by a factor of 2. In FIG. 9, interpolated data values (indicated as broken-line outlines) are computed for each for each of the input picture element data values $d_{11}$, $d_{13}$, $d_{31}$, $d_{32}$, as follows:

$$d_{12} = (d_{11} + d_{13})/2$$

$$d_{32} = (d_{31} + d_{33})/2$$

$$d_{21}=(d_{11}+d_{31})/2$$

$$d_{22}=(d_{12}+d_{32})/2$$

$$d_{23}=(d_{13}+d_{33})/2$$

Thus, with the third embodiment described above, the density of the image data that are supplied to the bi-level conversion circuit 21 is increased, and the bi-level data produced from the bi-level conversion circuit 21 can then be set to a predetermined value of scan line density by the variable data reduction circuit 22 as for the second embodiment described above. As a result, due to the increased data density achieved by the interpolation circuit 24, spatial distortions in the image data which are introduced by the "thinning-out" operation of the variable data reduction circuit 22 can be effectively reduced.

In the first embodiment of FIG. 1(a), the black region expansion section 12 executes black region expansion processing of all of the image outline data that are produced from the bi-level variation detection section 11. A fourth embodiment of the present invention will be described in which, instead of using all of these data, only a part of the data produced from the bi-level variation detection section 11 are selected to be used for black region expansion processing. This is achieved by utilizing a selective black region expansion section between the bi-level variation detection section 11 in place of the black region expansion section 12 shown in FIG. 1(a), for eliminating all data produced from the bi-level variation detection section 11 that cannot form part of a bar code region pattern and for executing black region expansion processing for the remaining data. To achieve this, the selective black region expansion section 12 employs and M×7 scanning window (where the value M is determined in accordance with the maximum thickness of a bar in the bar code or the maximum spacing between adjacent bars, as for the M×M scanning window of the black region expansion section 12, described hereinabove), through which each of the data values produced from the bi-level variation detection section 11 are passed. Each time the contents of the scanning window are updated, a check is made to find if the window contents correspond to any of a plurality of predetermined patterns (each of which cannot occur as part of a bar code region outline). If the current set of data values in this M×M scanning window match any of these predetermined patterns, then a 0 (i.e. white state) value is produced as a data value corresponding to the scanning window contents, i.e. the window contents are not used in black region expansion processing. If the current set of data values in the scanning window does not match any of these predetermined patterns, then as for the black region expansion section 12 described above, the OR logic sum of the states of the data values in the M×M window is produced as a data value corresponding to the window contents, to thereby execute black region expansion processing as for the first embodiment described above.

FIG. 10 shows various examples of such predetermined patterns, contained in an M×M scanning window, which in this example is a 7×7 square window. None of the patterns in FIG. 10 can occur as part of a bar code region outline. In the case of the intersecting patterns of FIGS. 10(a) to (d), a decision is made to eliminate the contents of the current scanning window from the black region expansion processing if the center data value of the window is in the 1 state, while at least five of each of the A and B data values in the window are in the 1 state, since this indicates that the contents of the scanning window cannot form part of a bar code region outline. In this case, a 0 output is produced in response to the dw contents. In the case of the each of the patterns of FIGS. 10(e) to (h), a decision is made to eliminate the contents of the current scanning window from the black region expansion processing if the contents of the scanning window contain the arrangement of 0 state data values of any of these patterns, while at least one data value within each of the four regions indicated as A, B, C and D (mutually separated by intersecting sets of 0 state data values) contains at least one data value that is in the 1 state. In the case of the pattern of FIG. 10(i), a decision is made to eliminate the contents of the current scanning window from the black region expansion processing if all of the data values around the periphery of the scanning window are in the state 0 state as shown, while in addition, the inner region A contains at least one data value that is in the 1 state.

If the contents of the 7×7 scanning window are detected by the selective black region expansion section 12 as conforming to a pattern other than any of those shown in FIG. 10, then this indicates a possibility that the scanning window contents may form part of a bar code region outline, and hence the logic sum of the data values within the scanning window is obtained, to form part of the data that are subsequently transferred to the black region contraction section 13 for black region contraction processing as described hereinabove.

In this way, the amount of background black regions which must be eliminated by the black region contraction processing executed by the black region contraction section 13 is substantially reduced, thereby enabling more effective elimination of background "noise" regions in the data produced from the black region contraction section 13 and enabling a higher speed of operation.

Figure 11:
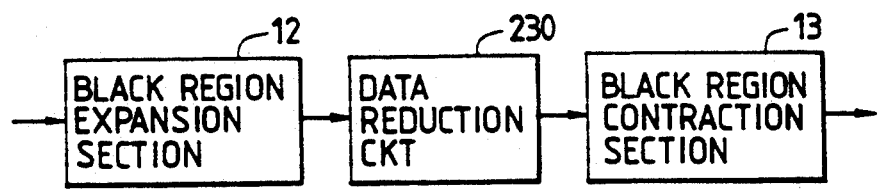
FIGS. 11 and 12 are partial block system diagrams of fourth and fifth embodiments respectively.

As described above referring to FIGS. 2(d) and 2(e), the black region contraction section 13 of the first embodiment shown in FIG. 1(a) executes a logic AND operation on the contents of a scanning window through which all of the data values produced from the black region expansion section 12 (derived by the aforementioned black region expansion processing) are passed, to thereby execute contraction of the black regions represented in the data produced from the black region expansion section 12. However such logic AND processing requires a relatively large amount of time, and a large number of AND gates. FIG. 11 is a partial system block diagram of a fifth embodiment of an image signal processing apparatus according to the present invention, with only the constituent blocks of the region derivation section 8 being shown. The fifth embodiment differs from the first embodiment of FIG. 1(a) in that with the fifth embodiment, the black region contraction section 13 is preceded by a data reduction circuit 230, which substantially reduces the amount of data that are transferred from the black region expansion section 12 to the black region contraction section 13. This data reduction circuit 230 functions by "thinning out" the number of data values in each scan line of the data supplied from the black region expansion section 12 (e.g. by transferring to the black region contraction section 13 only one out of every m data values that are supplied from from the black region expansion section 12, where m is a fixed integer) and similarly "thinning out" the scanning lines of the data, (by the same reduction factor m), to thereby achieve data reduction by equal proportions in the main scanning direction and the secondary scanning direction. This function is similar to that of the variable data reduction circuit 22 described hereinabove with reference to FIGS. 5 and 6, so that detailed description will be omitted. However the data reduction circuit 230 of the fifth embodiment need only produce a fixed amount of data reduction, i.e. need not be capable of varying the degree of reduction, such as is possible with the variable data reduction circuit 22. Designating the combined reduction factor that results from this data reduction circuit 230 in conjunction with the contraction produced by the contraction section 13 as R, and the width of a bar code region (i.e. as measured perpendicular to the direction of elongation of the bar code region, and expressed as a number of picture elements) as S, the product R.S The reduction factor of this data reduction circuit 230 must be determined such that the combined degree of reduction that is produced by reduction circuit 230 together with the reduction produced by the black region contraction section 13 must not reduce the width of a bar code region below a certain minimum value, e.g. to ensure that "skeleton" black region black regions corresponding to the bar code regions will remain, as shown in FIG. 2(e), while most of the extraneous background black regions are eliminated.

The use of such a data reduction circuit will result in a loss of accuracy of determining the center point coordinates of a bar code region by the bar code position detection section 4, since the data reduction operation is equivalent to a lowering of resolution of the image data represented by the data values that are produced from the black region expansion section 12. Hence, the amount of data reduction that is produced by this data reduction circuit 230 must be no greater than a value which will ensure satisfactory accuracy for obtaining the center point coordinates of the bar code regions.

By using such a data reduction circuit 230 immediately prior to the black region contraction section 13, the size of the scanning window used in the black region contraction section 13 can be reduced, and hence the circuit configuration of the black region contraction section 13 can be simplified and the speed of operation increased.

Figure 12:
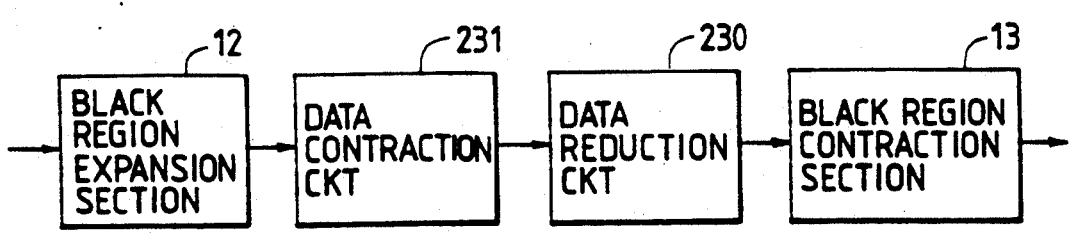

A sixth embodiment of the invention will now be described. FIG. 12 is a partial system block diagram of the sixth embodiment, with only the constituent blocks of the region derivation section 8 being shown. This embodiment differs from the fifth embodiment of FIG. 11 in that the data reduction circuit 230 is preceded by a data contraction circuit 231, which executes contraction of data that are transferred from the black region expansion section 12 to the 230. This data contraction circuit 231 functions in a similar manner to the black region contraction section 13 described hereinabove, but utilizes an m×m scanning window (where 1/m is the reduction factor produced by the contraction section 230 as described above), with logic AND processing being applied to the window contents. In addition, the data reduction circuit 230 executes data reduction (i.e. by "thinning-out" as described hereinabove) of the data produced from the data contraction circuit 231, by the factor 1/m. The data values that are thereby obtained from the data reduction circuit 230 are then subjected to data contraction processing by the black region contraction section 13, using the M×M scanning window. As a result of these successive data contraction, data reduction, and data contraction processing operations executed by the data contraction circuit 231, the data reduction circuit 230, and the black region contraction section 13, output data are obtained which represent a converted image having a predetermined image size (where "size" is expressed in terms of numbers of picture elements), with the bar code regions appearing in that converted image as "skeletion" black region black regions, with the background black regions effectively eliminated. In practice, a value of 8 has been found to be satisfactory as the value of m. However m is basically arbitrarily determined.

Figure 13A:
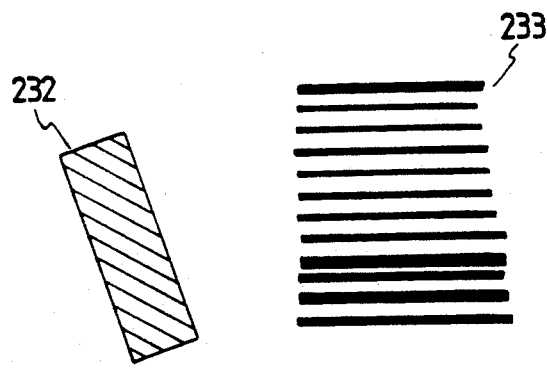
FIGS. 13(a-b) are diagrams for describing an effect achieved by the fifth embodiment.
Figure 13B:
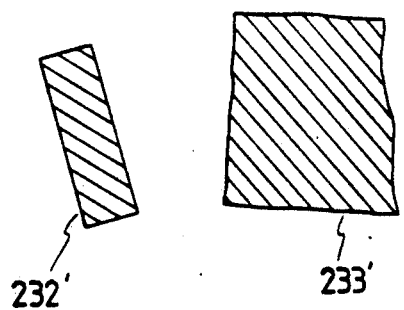

The advantage gained by utilizing the data contraction circuit 231 prior to the data reduction circuit 230 and black region contraction section 13 will be described referring to FIGS. 13(a) and (b). FIG. 13(a) shows an example of a converted image, represented by the output data produced from the black region expansion section 12. 232 denotes a full-black region which corresponds to a bar code region in the source image. 233 denotes a pattern of succesively adjacent black regions which has been accidentally produced by the black region expansion section 12, e.g. as a result of some pattern in the source image, unrelated to the bar code. If this image data is directly supplied to the 230, so that "thinning-out" in the main scanning direction and secondary scanning direction is executed (i.e. periodic elimination of rows and columns of picture elements represented as data values), then it is possible that the mutually adjacent black regions within the pattern portion 233 may be brought sufficiently close together, in the converted image represented by the output data from the data reduction circuit 230, to merge into a continuous region. The result will be to produce a corresponding full-black region 230' in that converted image, as illustrated in FIG. 13(b), in addition to the reduced-size full-black region 232' corresponding to the region 232. However by executing pre-processing by the data contraction circuit 231 of the data that are produced from the black region expansion section 12, black region pattern portions that are represented in these data can be substantially eliminated, by the logic AND processing executed within a scanning window as described hereinabove.

The bar code position detection section of the first embodiment described above is suitable for use with bar code regions which are of substantially elongated rectangular shape. A seventh embodiment of an image signal processing apparatus will be described, referring to FIGS. 14 to 21, which is applicable to bar code regions which are of various rectangular shapes, including square shaped regions. With this embodiment, as shown in the partial system block diagram of FIG. 14, the bar code position detection section 4 of the first embodiment shown in FIG. 1(a) is replaced by a bar code position detection section 4a. The remaining system blocks of this embodiment are identical to those of FIG. 1(a), and further description of these will be omitted. The bar code position detection section 4a differs from the detection section 4 of FIG. 1(a) in containing a boundary coordinate detection section 101 for detecting the main scanning direction coordinates of respective terminal positions of sets of successively mutually adjacent black picture elements (i.e. corresponding 1 state data values) which extend along the main scanning direction, to form full-black regions within respective scanning lines of the image data. Such sets of mutually adjacent black picture elements extending within a single scan line will be referred to as black row blocks, since each scan line of picture elements is represented as a horizontal row in the drawings. In the bar code position detection section 4a, numeral 102 denotes a linkage judgement section, for judging whether black row blocks are mutually linked along the secondary scanning direction, i.e. to judge each black row block to determine whether it forms part of a black region constituted by a plurality of black row blocks that are mutually linked in the secondary scanning direction. A terminal point coordinate detection section 103 detects those picture elements within a black region (formed of a plurality of black row blocks mutually linked in the secondary scanning direction) which have coordinates that are at maximum and minimum positions along the main scanning direction and the secondary scanning direction (i.e. picture elements which are positioned at the uppermost or lowermost positions, or rightmost or leftmost positions of a black region, as viewed in the drawings). A read-out coordinate computing section 104 computes readout position coordinates, for reading out bar code region data values from stored image data values.

Figure 15A:
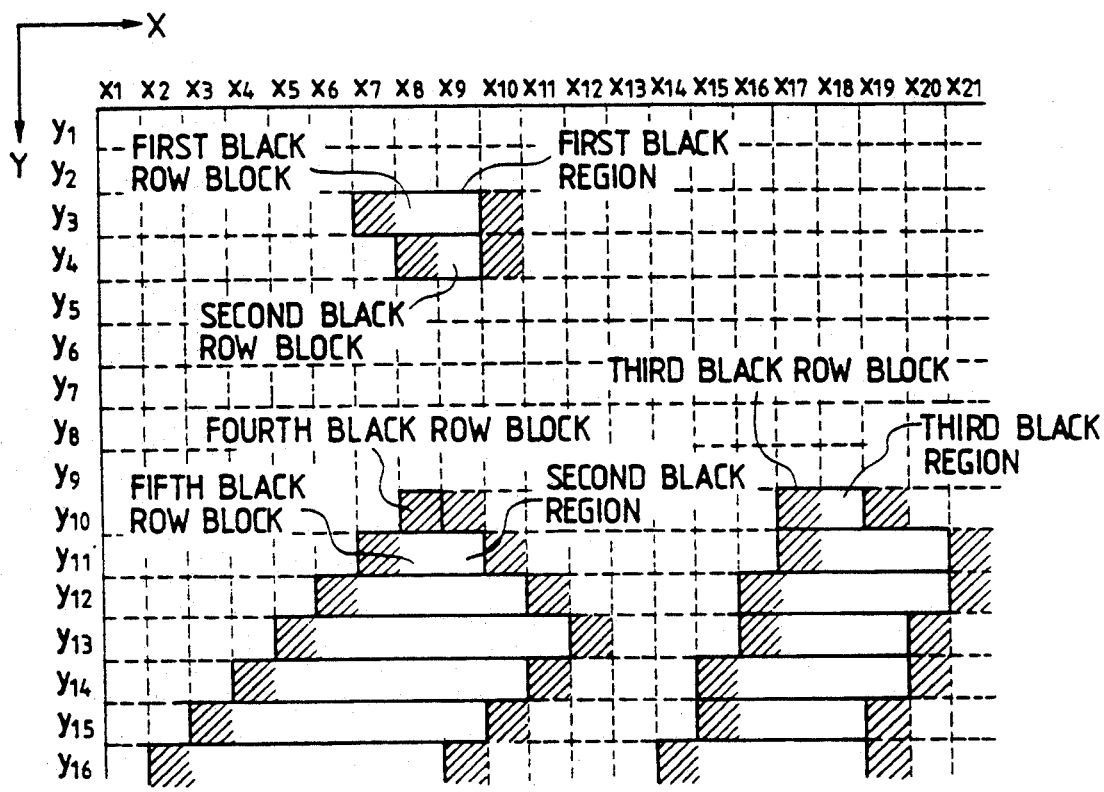
FIG. 15(a) is a diagram illustrating how black regions of an image are formed as row blocks of black-state picture elements.

The operation of this embodiment is as follows. The boundary coordinate detection section 101 detects boundary coordinates of respective black row blocks, along the main scanning direction, which are represented in the contracted image data produced from the black region contraction section 13. Specifically, for each picture element data value, the boundary coordinate detection section 101 computes the exclusive-OR value of the x-coordinate of that picture element in conjunction with that of the immediately preceding picture element (i.e. the picture element whose data value is produced in the immediately preceding processing clock period). If the result is logic 1, then this indicates that a boundary coordinate has been detected. FIG. 15(a) illustrates various terminal picture element positions (shown as cross-hatched squares) of respective black row blocks. The coordinates of each such terminal picture element will be referred to as boundary coordinates of a black row bloc. For each black row block, there is a single secondary scanning direction boundary coordinate (i.e. y-coordinate) and a pair of main scanning direction boundary coordinates (i.e. x-coordinates). These boundary coordinates are stored in respective registers with the arrangement illustrated in FIG. 15(b).

The data that are supplied to the bar code position detection section 4a are first processed by the boundary coordinate detection section 101 to detect each of the black row blocks that are represented in the data. Each time that a black row block is detected, the y-coordinate of the block and the initial x-coordinate and terminating x-coordinate of the block (respectively indicated as Xs, Xe in FIG. 15(b)) are stored in a register. Next, when this processing has been completed for all of the image data, the linkage judgement section 102 executes processing to determine those of the black row blocks which are mutually linked to form one or more black regions, e.g. the first, second and third black regions shown in FIG. 15(a).

Figure 16:
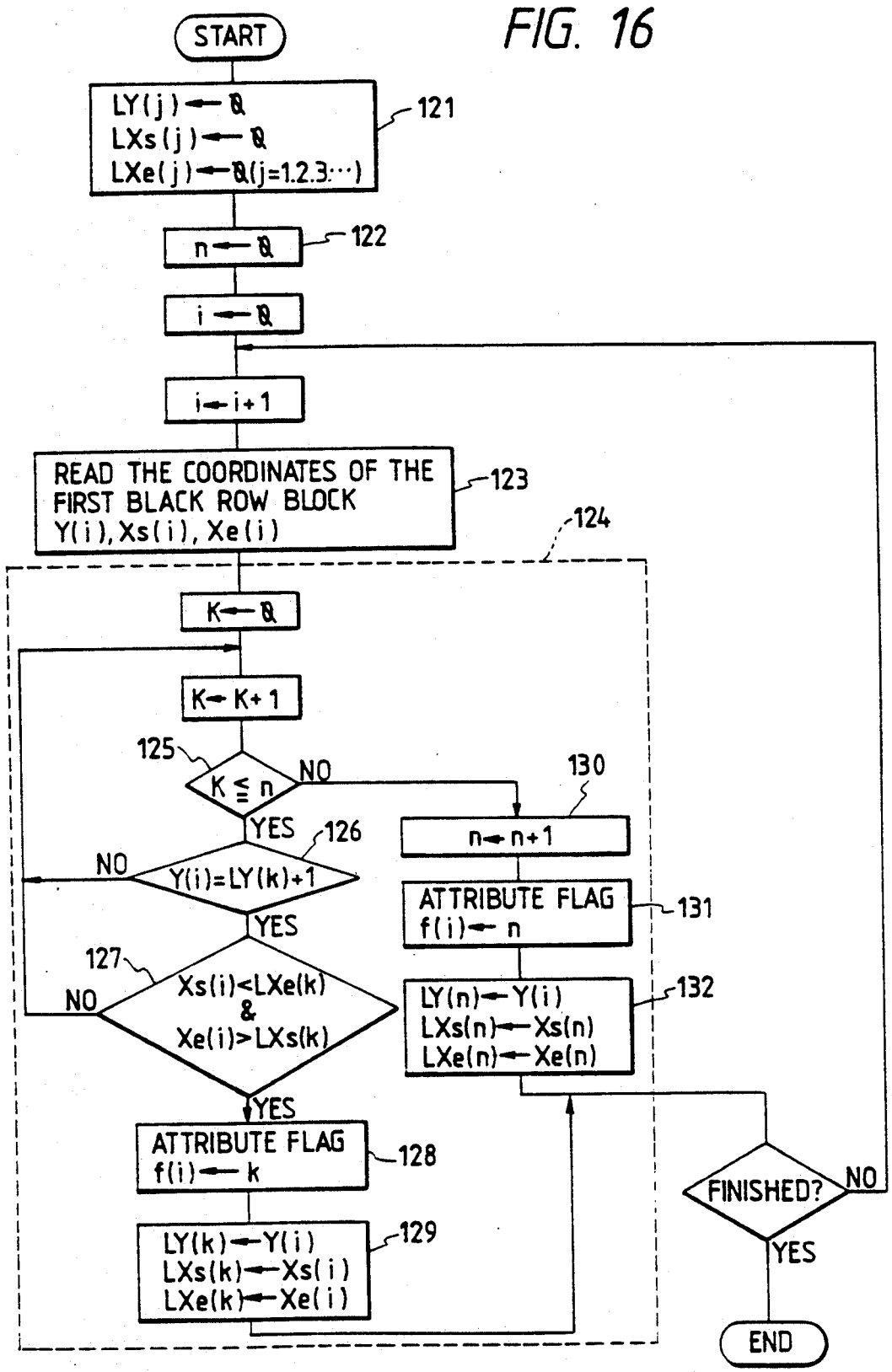
FIG. 16 is a flow chart of operations executed to determine the respective black regions to which successive black row blocks belong.
Figure 17A:
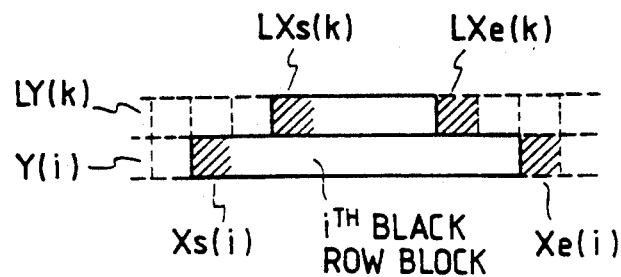
FIGS. 17(a-d) are diagrams for illustrating four ways in which a black region can be linked to a previously registered black row block.
Figure 17B:
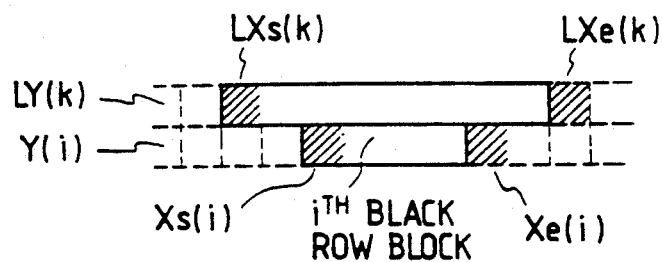
Figure 17C:
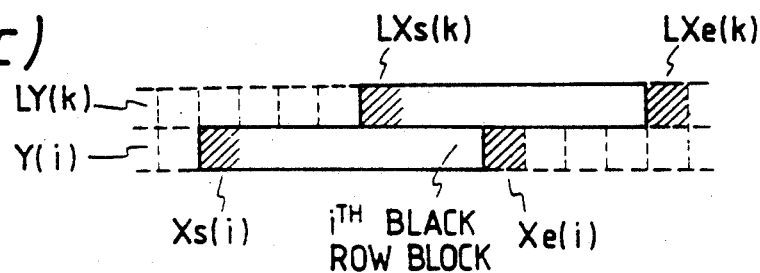
Figure 17D:
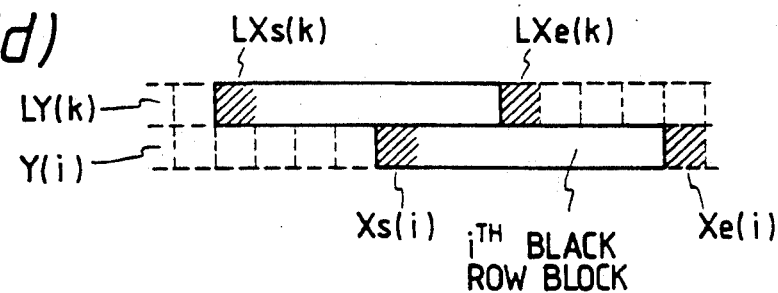

FIG. 16 is an operating flow chart for illustrating the processing that is executed by the linkage judgement section 102. As can be understood from FIG. 15, each of the black regions is detected as a succession of black row blocks, i.e. which are successively detected (along the secondary scanning direction) as being linked with that black region. In FIG. 16, the y-coordinate of the most recent black row block to have been detected as linked to a black region is designated as KY(j), the initial x-coordinate of that black row block is designated as KXs(j), and the terminating x-coordinate of that black row block is designated as KXe(j), where j takes the successive values 1, 2, 3, ... The count in a counter register that is used to count successive black regions is designated as n, and the contents of an attribute flag which designates the black region to which the $i^{th}$ black row block belongs are designated as f(i), where i takes the values 1, 2, 3, ... In an initializing step 121, LY(j), LXs(j) and LXe(j) are each set to zero. In step 122, the count n is initialized, and in step 123 the boundary coordinates Y(i), Xs(i) and Xe(i) for the $i^{th}$ black row block are read out from one of the registers shown in FIG. 15(b).

Next, in a linkage judgement set of steps 124, a decision is made as to which of the black regions the $i^{th}$ black row block belongs. This set of steps 124 will be described in detail referring to the drawings. In the set of steps 124, based on the boundary coordinates Y(i), Xs(i) and Xe(i) for the $i^{th}$ black row block, successive linkage judgement decision are made for each of the black row blocks as to the respective black regions to which the black row blocks belong. These decisions are made for the $i^{th}$ black row block based on a set of black regions which have already been registered prior to the step of linkage judgement for the $i^{th}$ black row block. These successive judgements are executed until the contents k of a counter (which is initialized at the start of the steps 124) has been successively incremented from 1 to n. Within the set of steps 124, if it is found in a decision step 125 that the $i^{th}$ black row block does not belong to any of the black regions which have been registered up to that time, then operation proceeds to a step 130, to begin operations for registering that $i^{th}$ black row block as the first part of a new black region. In step 130, the black region counter n is incremented by one, in step 131 the attribute flag f(i) is set to n, and in step 132, new values of boundary coordinates LY(n), LXs(n) and LXe(n) are registered for this new black region, i.e. as the $n^{th}$ black region, in the register whose contents are shown in FIG. 15(b).

In a decision step 126, a judgement is made as to whether the $i^{th}$ black row block is linked along the secondary scanning direction to a previously registered black region (i.e. to find if the y-coordinate of that row block immediately follows the y-coordinate of the last row block in the $k^{th}$ black region, along the secondary scanning direction). If a NO decision is reached in step 126, then this judgement operation is repeated for another black region, by incrementing k. If a YES decision is reached in step 126, then operation advances to step 127 in which is made as to whether the $i^{th}$ black row block is linked along the main scanning direction to a previously registered black region.

Such linkage of black row blocks along the main scanning direction can be of four types, as illustrated in FIG. 17(a) to (d). For each of these conditions, the following relationships are both satisfied:

Xs(i) < LXe(k) and,

Xe(i) > LXe(k)

If a YES decision is reached in step 127, then this indicates that the $i^{th}$ black row block belongs to the $k^{th}$ black region, and so the attribute flag f(i) is set to the value k, and in step 129 the updated boundary coordinates LY(n), LXs(n) and LXe(k) are registered for the $k^{th}$ black region.

By executing these linkage judgement steps 124 for all of the black row blocks, it is possible to isolate a plurality of black regions that are represented in the output data from the black region contraction section 13, i.e. as shown in FIG. 15(a).

Figure 14:
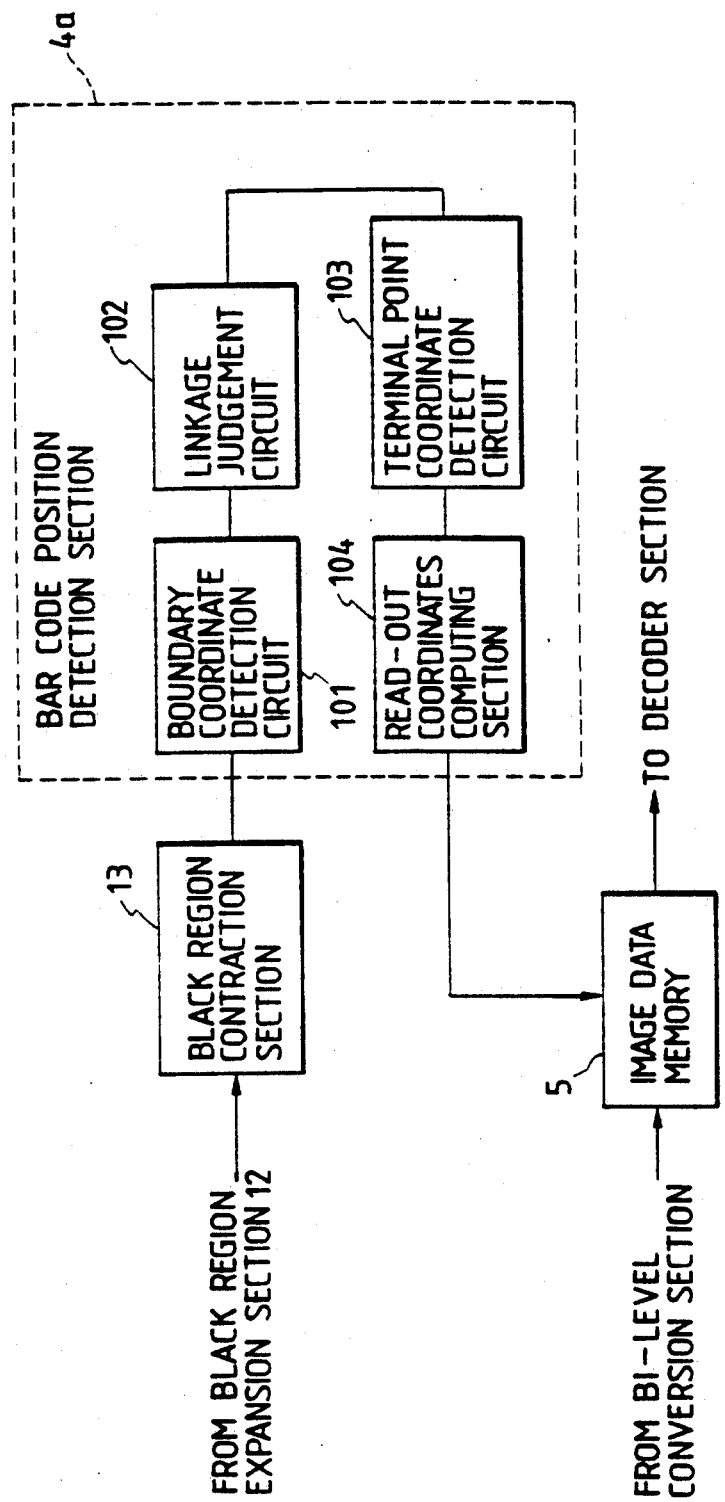
FIG. 14 is a partial system block diagram of a seventh embodiment of the invention, showing a bar code position detection section.
Figure 18:
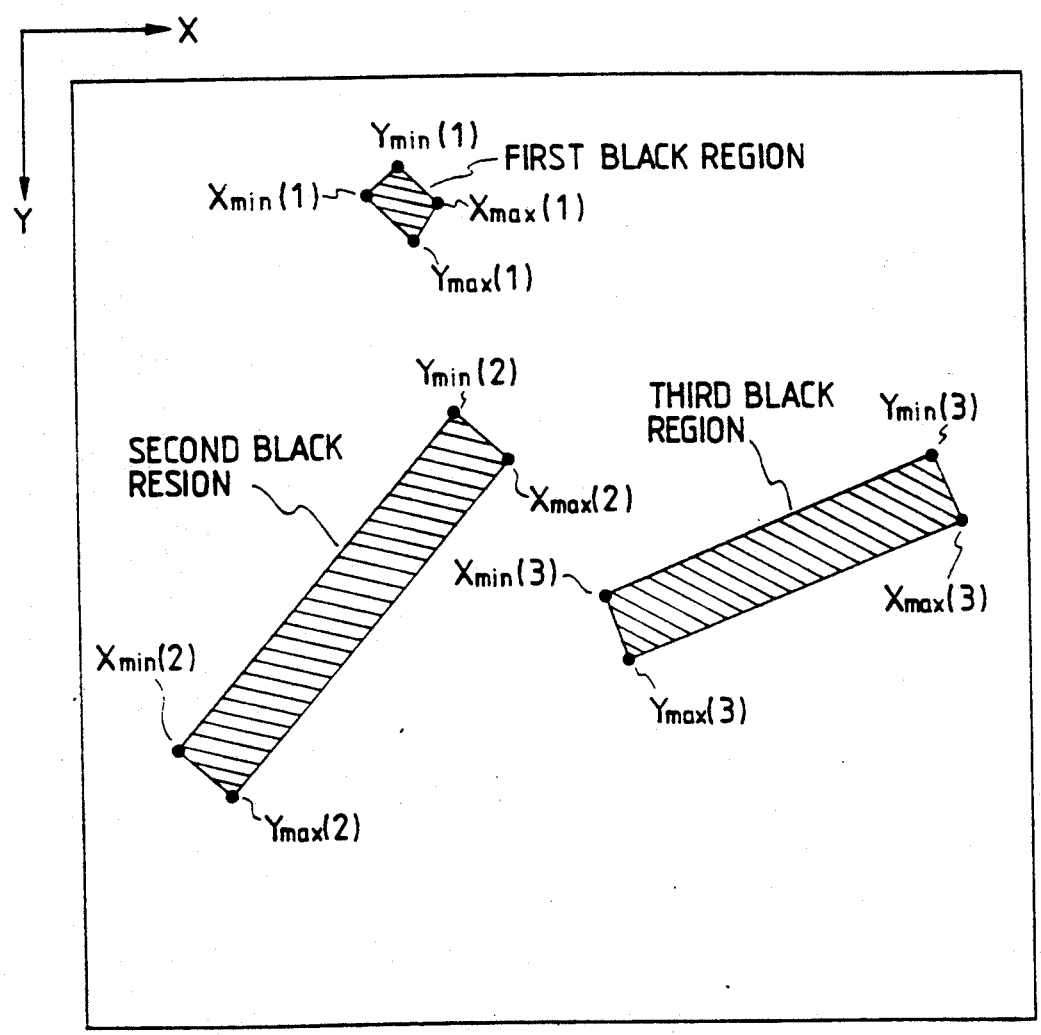
FIG. 18 is a diagram illustrating terminal point coordinates of respective black regions obtained by black region expansion and black region contraction processing with the seventh embodiment.

The terminal point coordinate detection section 103 in FIG. 14 serves to detect, for each of the black regions shown for example in FIG. 18, a point (i.e. a picture element position) $Y_{min}$ having the smallest coordinatd value of that black region in the secondary scanning direction, a point $Y_{max}$, having the maximum value of secondary scanning direction coordinate, a point $X_{min}$, having the the smallest coordinate value of that black region in the main scanning direction, and a point $X_{max}$, having the maximum value of main scanning direction coordinate. These points $Y_{min}$, $Y_{max}$, $X_{min}$ and $X_{max}$ of a black region will be referred to as the terminal points of that region. The terminal point coordinate detection section 103 derives these coordinate values based on the boundary coordinates of the black row blocks constituting that black region, which have been obtained by the processing described above, executed by the linkage judgement section 102.

Figure 19:
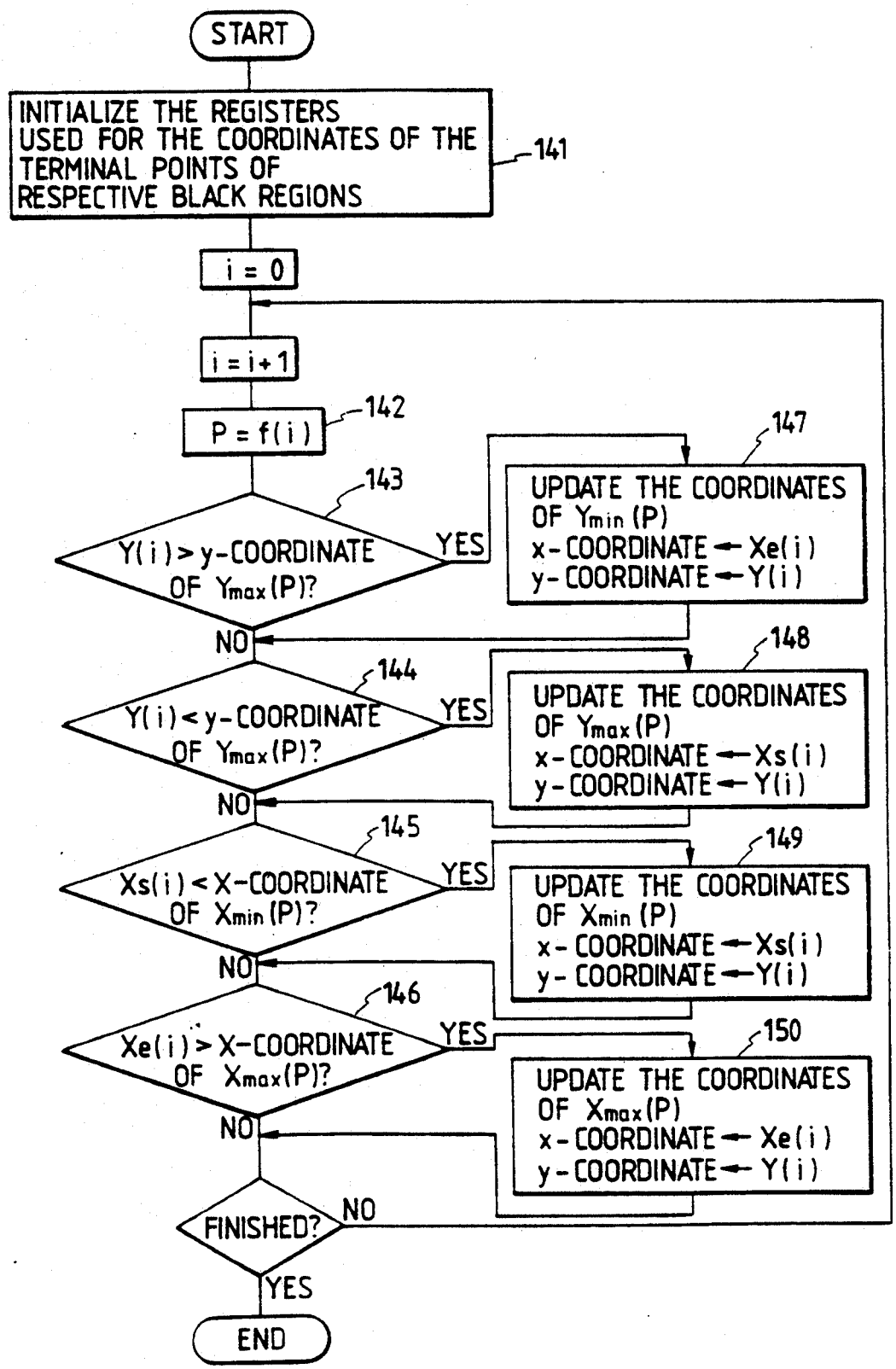
FIG. 19 is a flow chart of operations for obtaining terminal point coordinates of respective black regions with the seventh embodiment.

FIG. 19 is a flow chart of the processing which is executed to obtain these terminal points for each of the black regions, based on the attributes represented by the attribute flag f(i) obtained for the $i^{th}$ black row block as described above. In a first step 141, initial values are is set in a terminal point coordinate register, for each of the black regions that are represented by the output data from the black region contraction section 13 (e.g. the three black regions in FIG. 18. In step 142, the contents of the attribute flag of the $i^{th}$ black row block are set as a value P. In step 143, a decision is made as to whether Y(i) is greater than the y-coordinate of point $Y_{min}$. In step 144, a decision is made as to whether Y(i) is less than the y-coordinate of point $Y_{max}$. In step 145, a decision is made as to whether Xs(i) is less than the x-coordinate of $X_{min}$. In step 146 a decision is made as to whether Xe(i) is greater than the x-coordinate of $X_{max}$. In steps 147, 148, 149 and 150 the y and x-coordinates of the points $Y_{min}$, $Y_{max}$, $X_{min}$ and $X_{max}$ are respectively updated.

Figure 21:
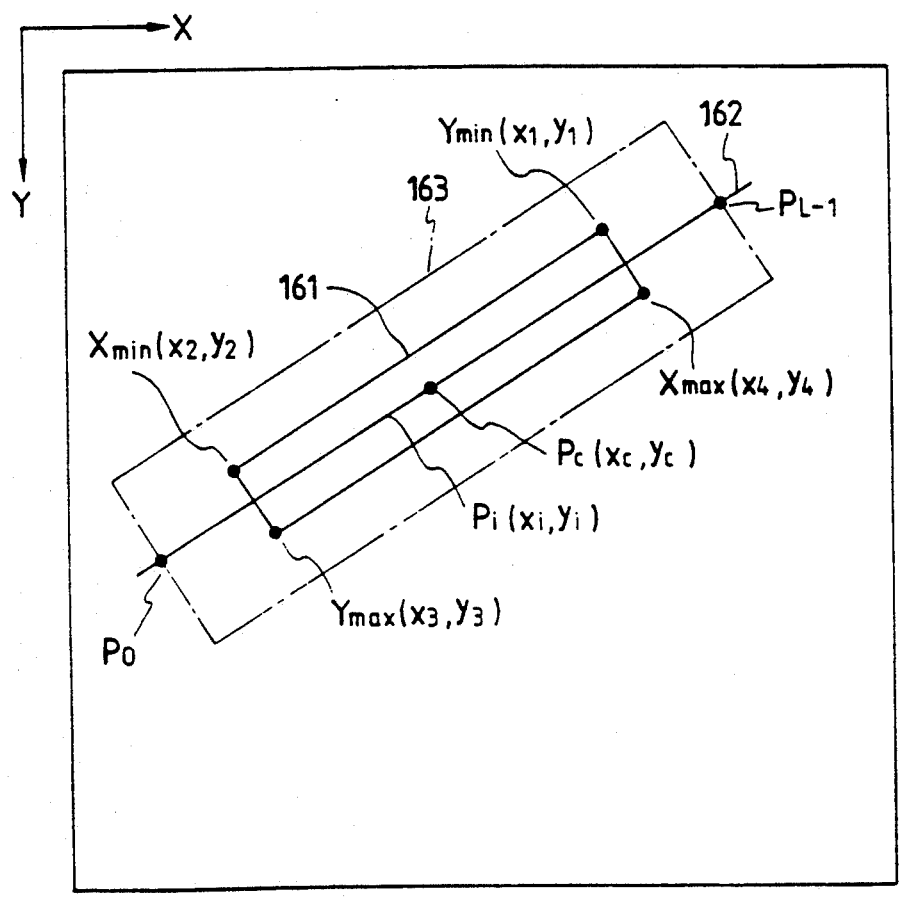
FIG. 21 is a diagram to illustrate processing for deriving the center position coordinates and center line of a bar code region, based on terminal point coordinates of the bar code region "skeleton" black region, for the seventh embodiment.

The operation flow of FIG. 19 will be described more specifically, referring to the drawings. In step 141, initial values such as those shown in FIG. 20 are set into terminal point coordinate registers for the respective black regions. For each black region, the minimum value of secondary scanning direction coordinate of that region is set as the y-coordinate of the point $Y_{min}$ of that region, and the maximum value of main scanning direction coordinate of the black region is set as the x-coordinate of the point $X_{min}$ of that black region. FIG. 17 shows an example of these coordinate values for $X_{min}$, $Y_{min}$ etc for various black regions (indicated as the first black region, second black region, etc), stored in respective coordinate registers. For each of the black regions, the y-coordinate of the point $Y_{min}$ for that region is the smallest value of y-coordinate (i.e. secondary scanning direction coordinate) within that region, and is indicated in FIG. 21 as a value S. Similarly, the x-coordinate of the point $X_{min}$ for a black region is the smallest value of x-coordinate (i.e. main scanning direction coordinate) within that region, and is indicated as M in FIG. 21.

In step 142, a value specifying the particular black region to which the $i^{th}$ black row block belongs, is set as P. In step 143, a magnitude comparison is made between Y(i) and the y-coordinate of the point $Y_{min}$(P). If a YES decision is obtained, then step 147 is executed in which the x-coordinate and y-coordinate of $Y_{min}$(P) are updated. In steps 144, 145, and 146, magnitude comparisons are respectively executed between the y-coordinate of $Y_{max}$(P) and Y(i), between the x-coordinate of $X_{min}$(P) and Xs(i), and between the x-coordinate of $X_{max}$(P) and Xe(i). Respective YES decisions from these comparison steps result in coordinate updating being executed in steps 148, 149 and 150.

The above procedure is executed for each of the black row blocks, to obtain terminal point coordinates for each of the black regions represented by the data produced from the black region expansion section 12. Since each of the black regions which correspond to a bar code region will have a basically rectangular shape, it will be apparent that this processing will derive the coordinates of the four corners of such a black region, as represented in the output data from the black region contraction section 13.

FIG. 21 is a diagram for illustrating the derivation of position relationships for executing reading of the bar code data with this embodiment. Numeral 161 denotes a the outline of a black region that is represented in the output data from the black region contraction section 13, corresponding to a bar code region that has been contracted in size. The original bar code region is indicated by numeral 163. 162 denotes a straight line which is a bar code read-out position line that passes through the center point Pc, as described hereinabove for the preceding embodiments. The read-out coordinate computing section 104 computes the coordinates (Xc, Yc) of a center point Pc of the bar code region, and the slope k of the line 162, based upon the terminal points $Y_{min}$ (x1, Y1), $X_{min}$ (x2, y2), $Y_{max}$ (x3, y3) and $Y_{min}$ (x4, y4), which are derived by the terminal point coordinate detection section 103 as described above. A set of data values stored in the image data memory 5 which correspond to positions along the line 162 are then read out from the image data memory 5, to in effect scan along the bar code and thereby read the code data.

The read-out coordinate computing section 104 computes the center point coordinates (Xc, Yc) and the slope k (where the term "slope", as for the first embodiment, signifies the tangent of the angle between line 162 and the main or secondary scanning direction) from the following equations.

If the line segment extending from point $Y_{min}$ to $X_{min}$ is longer than the line segment extending from point $Y_{min}$ to $X_{max}$, then $$k = \frac{(x1 + x4) - (x2 + x3)}{(y1 + y4) - (y2 + y3)}$$

If the line segment extending from point $Y_{min}$ to $X_{min}$ is shorter than the line segment extending from point $Y_{min}$ to $X_{max}$, then $$k = \frac{(x1 + x2) - (x3 + x4)}{(y1 + y2) - (y3 + y4)}$$

$$Xc = (x1 + x2 + x3 + x4)/4$$
$$Yc = (y1 + y2 + y3 + y4)/4$$

Designating the length of the bar code region 163 as L (i.e. as measured along a direction perpendicular to the bars of the region) the set of integer coordinates (Xi, Yi) of the linear array of bar code data read-out positions {Pi} are obtained, as for the first embodiment described hereinabove, as follows:

If $k < 1$, then $$Xi = [(Xc - L/2) + ]$$

$$Yi = [(Yc - l/2) + i.k]$$

while if $k > 1$, then, $$Xi = [(Xc - L/2) + i/k]$$

$$Yi = [(Yc - L/2) + i] \quad (i = 0, L = 1)$$

Each of the values contained in the square brackets is converted to an integer, by rounding off.

The set of data values stored in the image data memory 5 which correspond to successive positions along the line 162 between the points $P_0$ and $P_{(L-1)}$, are then successively read out from the image data memory 5 by using that linear array of coordinates (Xi, Yi), and supplied to the decoder section 6 to be decoded.

Figure 22A:
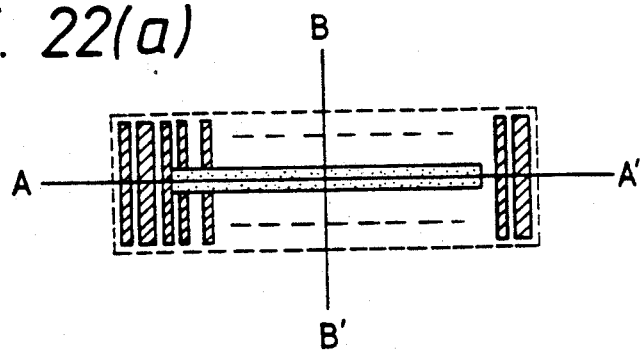
FIGS. 22(a) to (c) are diagrams for illustrating how the present invention can be applied to various shapes of bar code region.
Figure 22B:
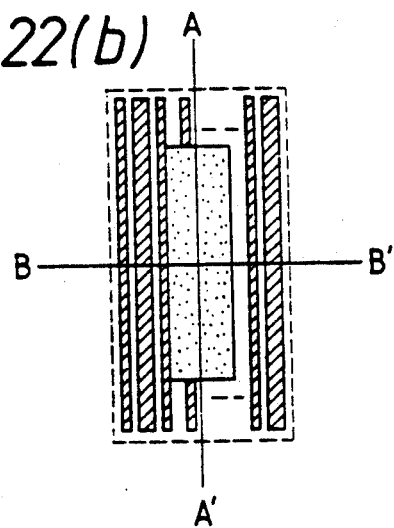

In the descriptions of the above embodiments, it has been assumed that a bar code region has an elongated rectangular shape, with the axis of elongation being perpendicular to the direction of elongation of the bars. Thus, a straight line A—A' is derived, passing through the bar code region center point and lying along the axis of elongation of the bar code region, for reading out the data values of picture elements which lie along that straight line and thereby reading the bar code contents. However it is possible that the bar code region is shaped as shown in FIG. 22(b), with the axis of elongation being aligned with the direction of elongation of the bars. In this case, it is necessary to derive a straight line B—B' passing through the center point of the bar code region, to enable the bar code data to be read. With the first embodiment of FIG. 1(a), which must convert a bar code region to a thin elongated black region as shown for example in FIG. 2(e), in order to accurately compute values for establishing the aforementioned bar code read-out line, a bar code region of the shape shown in FIG. 22(b) can be read by first deriving a straight line corresponding to the axis of elongation A—A' as described for the first embodiment, then deriving a line B—B' which passes through the center point of the bar code region and is perpendicular to line A—A'. The bar code data can then be read by reading out from the image data memory 5 the data values of picture elements which line along that line B—B', within the bar code region.

With the seventh embodiment described above, which is applicable to bar code regions which are not substantially elongated, or are square in shape, it is obviously easily possible to directly derive the line B—B of FIG. 22(b), using the coordinate values for the points $X_{min}$, $X_{max}$ etc, i.e. by obtaining a slope value k for an angle which is perpendicular to that of the line A—A'.

Figure 22C:
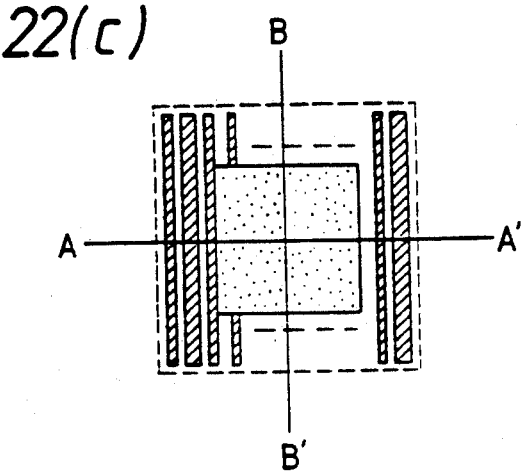

It is also possible that the bar code region may be of substantially square shape, as shown in FIG. 22(c). In that case, it is necessary to use the method of the seventh embodiment of obtaining a bar code read-out straight line, based on the coordinate values for the points $X_{min}$, $X_{max}$ etc, and to first read out from the image data memory 5 a set of data values within the bar code region which conform to the line A—A', then a set of data values which conform to the line B—B'. It will obviously be possible to easily discriminate between the correct and the incorrect read-out direction in that case, based on the contents of data which are read out from the image data memory 5, and to then utilize only the data which are obtained by read-out along the correct straight line (i.e. line A—A' in the example of FIG. 22(c) for decoding by the decoder section 6.

If it is not known beforehand which specific rectangular shape each bar code region will have, i.e. if the image signal processing apparatus is to be applicable to various types of bar code label, then it will be necessary to utilize the bar code data read-out method described above for the case of the square shape of FIG. 22(c), based on the bar code dectector method of the seventh embodiment.

Although not shown in the drawings, each of the embodiments of the invention operates under overall control that is executed by a microprocessor. Since such control is now very commonly utilized, description has been omitted in the specification.

What is claimed is:

1. An image signal processing apparatus for processing an input image signal representing successive ones of a set of data values of an array of picture elements of a source image containing at least one bar code region of rectangular shape, said array comprising successive scan lines each extending along a main scanning direction, with the scan lines successively arrayed along a secondary scanning direction, the apparatus comprising:

bi-level conversion means (2) for converting said set of data values of the input image signal to a first set of data bits, selectively indicating respective black and white states of said picture elements;

image memory means (5) for storing said first set of bits; bar code region detection means (3) including boundary line derivation means (7) for processing said first set of bits to produce a corresponding second set of bits representing a first converted image in which boundaries between black and white regions of said source image are formed as black boundary lines against a white background, black region expansion means (12) for processing said second set of bits to produce a third set of bits representing a second converted image in which regions between opposing ones of said boundary lines which do not exceed a predetermined maximum width are filled with black picture elements, and black region contraction means (13) for processing said bits from said black region expansion means to produce a fourth set of bits representing a third converted image in which black regions of said converted image produced by the black region expansion means are contracted in size by a predetermined amount, whereby in said third converted image a substantially rectangular black region appears which corresponds in slope and center position to a region in said source image having at least a minimum predetermined spatial frequency, with substantially all other black regions of said source image eliminated to form a white background;

bar code position detection means (4) for receiving said fourth set of bits from said bar code region detection means, to derive position coordinates representing a central axis and a center position of said black region of the third converted image, and for computing, based on a known length of said bar code region along said central axis and on said center position, respective read-out coordinates of a linear array of picture elements extending along said central axis within said bar code region; and decoding means (6) for reading out from said image memory means respective bits corresponding to said linear array of picture elements, and for decoding said bits to obtain data of said bar code region.

2. An image signal processing apparatus according to claim 1, wherein:

said boundary line derivation means comprises a logic circuit configured as a first scanning window, means for successively transferring successive ones of said first set of bits produced from said bi-level conversion means through said first scanning window, and logic processing circuit means for producing the exclusive-OR logic sum of the current data values in said first scanning window, as a data bit of said converted image;

said black region expansion means comprises a logic circuit configured as a second scanning window, means for successively transferring successive ones of the second set of bits through said second scanning window, and logic processing circuit means for producing the OR logic sum of the current data bits in said second scanning window, as a data bit of said second converted image; and said black region contraction means comprises a logic circuit configured as third scanning window, means for successively tranferring successive ones of said third set of bits produced from said black region expansion means through said third scanning window, and logic processing circuit means for producing the AND logic product of the current bits in said third scanning window, as a data bit of said third converted image.

3. An image signal processing apparatus according to claim 2, in which said black region expansion means further comprises means for comparing the current contents of said second scanning window with each of a plurality of predetermined patterns, and for unconditionally producing an output data bit representing the white picture element state if said current contents correspond to any of said patterns.

4. An image signal processing apparatus according to claim 1, wherein said bi-level conversion means (2) comprises:

bi-level conversion circuit means (21) for converting successive ones of said data values of the input image signal to respective bits; and data reduction circuit means (22) for executing a controllably variable degree of reduction of density of scanning lines represented by said bits, by periodic elimination of bits, for thereby supplying data having a fixedly predetermined value of scanning line density to said image memory means and bar code region detection means.

5. An image signal processing apparatus according to claim 1, wherein said bi-level conversion means comprises:

interpolation circuit means (24) for computing and inserting interpolated data values into said successive input image signal data values, to produce data values having a high data density;

bi-level conversion circuit means (21) for converting successive ones of said data values from said interpolation circuit means to successive data bits; and data reduction circuit means (22) for executing a controllable variable degree of reduction of density of scanning lines represented by said bits, by periodic elimination of bits, for thereby supplying data having a fixedly predetermined value of scanning line density to said image memory means and bar code region detection means.

6. An image signal processing apparatus according to claim 1, wherein said bar code position detection means comprises:

slope and center position computing means (9) for computing respectively coordinates of a center position of said black region in said third converted image represented by the fourth set of bits produced from said bar code region detection means, and a value representing an inclination of said central axis with respect to one of said main scanning direction and secondary scanning direction; and read-out coordinate computing means (10) for computing, based on said inclination value, upon said center position coordinates and upon said known length of said bar code region, said read-out coordinates of the linear array of picture elements extending along said central axis within said bar code region;

said slope and center position computing means comprise means for detecting first, second, third and fourth positions in said black region in the third converted image, each of said positions being expressed as a pair of coordinates measured along said main and secondary scanning directions respectively, said first, second, third and fourth positions respectively having a minimum value of coordinate as measured along said main scanning direction, a maximum value of coordinate as measured along said main scanning direction, minimum value of coordinate as measured along said secondary scanning direction, and a maximum value of coordinate as measured along said secondary scanning direction, and wherein said read-out coordinate computing means computes said read-out coordinates based on respective pairs of main scanning direction and secondary scanning direction coordinate values obtained for said first, second, third and fourth positions in said black region.

7. An image signal processing apparatus according to claim 1, wherein said bar code region detection means further comprises:

data reduction circuit means 230 for eliminating a predetermined proportion of said third set of bits produced from said black region expansion means and for supplying the remaining ones of said third set of bits to said black region contraction means.

8. An image signal processing apparatus according to claim 1, wherein said bar code region detection means further comprises:

data contraction means 231 comprising logic circuits configured as a scanning window, means for successively transferring each of said third set of bits through said scanning window, and logic processing circuit means for producing the AND logic product of the current contents of said scanning window as an output bit; and data reduction circuit means 230 for eliminating a predetermined proportion of said output bits produced from said data contraction means and for supplying the remaining ones of said output bits to said black region contraction means.

9. An image signal processing apparatus for processing an input image signal representing successive ones of a set of data values of an array of picture elements of a source image containing at least one bar code region of rectangular shape, said array comprising successive scan lines each extending along a main scanning direction, with the scan lines successively arrayed along a secondary scanning direction, the apparatus comprising;

bi-level conversion means for converting said set of data values of the input image signal to a first set of data bits, selectively indicating respective black and white states of said picture elements;

image memory means for storing said first set of bits;

boundary line derivation means for processing said first set of bits to produce a corresponding second set of bits representing a first converted image in which boundaries between black and white regions of said source image are formed as black boundary lines against a white background, said boundary line derivation means including a logic circuit configured as a first scanning window, means for successively transferring successive ones of said first set of bits through said first scanning window, and logic processing circuit means for producing the exclusive-OR logic sum of the current data values in said first scanning window, one of said second bits representing said first converted image;

black region expansion means comprising a logic circuit configured as a second scanning window, means for successively transferring successive ones of the second set of bits through said second scanning window, and logic processing circuit means for producing the OR logic sum of the current bit values in said second scanning window, as one of a third set of bits representing a second converted image;

black region contraction means comprising a logic circuit configured as a third scanning window, means for successively transferring successive ones of said third set of bits through said third scanning window, and logic processing circuit means for producing the AND logic product of the current data values in said third scanning window, as one of a fourth set of bits representing a third converted image containing a black region of substantially identical shape and orientation to said bar code region in the source image, and in which substantially all other black portions of said source image are eliminated to form a white background;

bar code position detection means for receiving said fourth set of bits from said bar code region detection means, to derive position coordinates representing a central axis and a center position of said black region of the third converted image, and for computing, based on a known length of said bar code region along said central axis and on said center position, respective read-out coordinates of a linear array of picture elements extending along said central axis within said bar code region; and decoding means for reading out from said image memory means respective bits corresponding to said linear array of picture elements, and for decoding said bits to obtain data of said bar code region.

* * * * *